US009242664B2

(12) United States Patent
Arceta et al.

(10) Patent No.: US 9,242,664 B2
(45) Date of Patent: Jan. 26, 2016

(54) MEDICAL CART, MEDICATION MODULE, HEIGHT ADJUSTMENT MECHANISM, AND METHOD OF MEDICATION TRANSPORT

(71) Applicant: Capsa Solutions, LLC, Portland, OR (US)

(72) Inventors: Radmond Vincent Arceta, Manassas, VA (US); Craig Kevin Rogers, Stephens City, VA (US); Kevin Thomas Fitzpatrick, Winchester, VA (US); Bryan Scott Ritchie, Clear Brook, VA (US); Marin John Philpott, Winchester, VA (US); Christina Louise Fortner, Stephens City, VA (US)

(73) Assignee: CAPSA SOLUTIONS, LLC, Portland, OR (US)

( * ) Notice: Subject to any disclaimer, the term of this patent is extended or adjusted under 35 U.S.C. 154(b) by 0 days.

(21) Appl. No.: 13/942,463

(22) Filed: Jul. 15, 2013

(65) Prior Publication Data

US 2013/0300075 A1 Nov. 14, 2013

Related U.S. Application Data

(60) Division of application No. 13/544,922, filed on Jul. 9, 2012, which is a continuation of application No. 13/187,328, filed on Jul. 20, 2011, now Pat. No. 8,215,650, which is a continuation of application No.

(Continued)

(51) Int. Cl.
*B62B 3/14* (2006.01)
*A61G 12/00* (2006.01)

(52) U.S. Cl.
CPC ............ *B62B 3/1476* (2013.01); *A61G 12/001* (2013.01); *B62B 2206/06* (2013.01)

(58) Field of Classification Search
CPC .......... B62B 3/00; B62B 3/002; B62B 3/005; B62B 3/14; B62B 3/1404; B62B 3/1476; B62B 3/18; B62B 2202/56; B62B 2202/67; B62B 2207/00; B62B 2207/02
USPC ............... 280/47.34, 47.35, 79.11, 79.3, 638, 280/651, 33.992; 108/147.19, 147.21; 235/431
See application file for complete search history.

(56) References Cited

U.S. PATENT DOCUMENTS

D146,375 S 2/1947 Obrig
2,848,290 A 8/1958 Doty (Continued)

FOREIGN PATENT DOCUMENTS

DE 195 40 058 6/1996
DE 196 49 982 6/1998

(Continued)

OTHER PUBLICATIONS

MLT 2001 Variable Height Laptop/Peripheral Cart (1997); 4 pgs.

(Continued)

*Primary Examiner* — Frank Vanaman
(74) *Attorney, Agent, or Firm* — Standley Law Group LLP

(57) ABSTRACT

A medical cart includes a work platform having a work surface and at least one compartment, a base, and a height adjustment mechanism for adjusting the height of the work platform relative to the base. A medication module includes a plurality of compartments. The medical cart can be joined with a medication module. In addition, a plurality of medication modules can joined to form a train. The medical cart and medication module can be used collectively and individually in a variety of methods far transferring medicine.

20 Claims, 20 Drawing Sheets

Related U.S. Application Data

12/550,771, filed on Aug. 31, 2009, now abandoned, which is a division of application No. 12/193,346, filed on Aug. 18, 2008, now Pat. No. 7,594,668, which is a continuation of application No. 10/783,030, filed on Feb. 23, 2004, now abandoned, and a continuation-in-part of application No. 29/196,712, filed on Jan. 2, 2004, now Pat. No. Des. 515,767, and a continuation-in-part of application No. 29/196,714, filed on Jan. 2, 2004, now Pat. No. Des. 517,768, and a continuation-in-part of application No. 29/196,713, filed on Jan. 2, 2004, now Pat. No. Des. 518,267.

(60) Provisional application No. 60/448,920, filed on Feb. 24, 2003, provisional application No. 60/484,658, filed on Jul. 7, 2003, provisional application No. 60/518,649, filed on Nov. 12, 2003, provisional application No. 60/532,900, filed on Dec. 30, 2003.

(56) References Cited

U.S. PATENT DOCUMENTS

| | | | |
|---|---|---|---|
| 3,015,494 A * | | 1/1962 | Fosbrook, Sr. ............ 280/33.991 |
| 3,024,036 A | | 3/1962 | Reynolds |
| 3,031,207 A | | 4/1962 | Bard |
| 3,174,768 A * | | 3/1965 | Sanders et al. ............ 280/33.994 |
| 3,208,768 A | | 9/1965 | Hulbert |
| 3,910,659 A | | 10/1975 | Peterson |
| D240,629 S | | 7/1976 | Cope |
| 3,993,319 A * | | 11/1976 | Day ........................ 280/33.992 |
| 4,071,740 A | | 1/1978 | Gogulski |
| 4,114,965 A | | 9/1978 | Oye et al. |
| 4,127,202 A | | 11/1978 | Jennings et al. |
| 4,440,096 A | | 4/1984 | Rice et al. |
| 4,735,469 A | | 4/1988 | Liggett |
| 4,766,422 A | | 8/1988 | Wolters et al. |
| 4,790,610 A | | 12/1988 | Welch et al. |
| 4,875,696 A | | 10/1989 | Welch et al. |
| 4,894,600 A | | 1/1990 | Kearney |
| 4,967,928 A | | 11/1990 | Carter |
| 4,976,450 A | | 12/1990 | Ellefson |
| 4,986,555 A | | 1/1991 | Andreen |
| 4,989,291 A | | 2/1991 | Parent |
| 5,058,911 A | | 10/1991 | Hunter et al. |
| 5,151,581 A | | 9/1992 | Krichever et al. |
| 5,174,223 A | | 12/1992 | Nagy et al. |
| 5,187,641 A | | 2/1993 | Muskatello et al. |
| 5,257,767 A | | 11/1993 | McConnell |
| D349,594 S | | 8/1994 | Bonazza |
| 5,348,324 A | | 9/1994 | Trotta |
| 5,472,220 A * | | 12/1995 | Stephan ....................... 280/79.5 |
| D367,381 S | | 2/1996 | Licari |
| 5,526,756 A | | 6/1996 | Watson |
| 5,564,803 A | | 10/1996 | McDonald et al. |
| 5,634,649 A | | 6/1997 | Breining et al. |
| 5,653,413 A | | 8/1997 | Fink |
| 5,655,743 A | | 8/1997 | Gillis |
| 5,680,820 A | | 10/1997 | Randolph |
| D387,168 S | | 12/1997 | Edelman et al. |
| D389,917 S | | 1/1998 | Hornback et al. |
| 5,704,625 A | | 1/1998 | Presnell et al. |
| 5,704,698 A | | 1/1998 | Lin |
| D390,733 S | | 2/1998 | Brunner et al. |
| 5,734,839 A | | 3/1998 | Enoki et al. |
| 5,758,848 A | | 6/1998 | Beule |
| 5,758,935 A | | 6/1998 | Coonan |
| 5,765,842 A | | 6/1998 | Phaneuf et al. |
| 5,806,943 A | | 9/1998 | Dell et al. |
| 5,841,361 A | | 11/1998 | Hoffman |
| D402,529 S | | 12/1998 | Husted |
| 5,842,708 A | | 12/1998 | Miyaoka |
| D410,230 S | | 5/1999 | Witte |
| 5,918,892 A * | | 7/1999 | Aaron et al. ............ 280/47.38 |
| 5,966,760 A | | 10/1999 | Gallant et al. |
| 5,967,479 A | | 10/1999 | Sweere et al. |
| 6,045,098 A | | 4/2000 | Timm |
| 6,050,660 A | | 4/2000 | Gurley |
| 6,073,942 A | | 6/2000 | Heneveld, Sr. |
| 6,079,676 A | | 6/2000 | Hackett et al. |
| D438,952 S | | 3/2001 | Cimino et al. |
| 6,219,587 B1 | | 4/2001 | Ahlin et al. |
| D441,513 S | | 5/2001 | Mullen et al. |
| 6,240,856 B1 | | 6/2001 | Paskey et al. |
| 6,289,825 B1 | | 9/2001 | Long |
| 6,339,732 B1 | | 1/2002 | Phoon et al. |
| D458,780 S | | 6/2002 | Siepmann et al. |
| D459,477 S | | 6/2002 | Stocks et al. |
| 6,397,761 B1 | | 6/2002 | Moore |
| 6,418,854 B1 | | 7/2002 | Kraft |
| 6,435,407 B1 | | 8/2002 | Fiordelisi |
| D462,674 S | | 9/2002 | Siepmann et al. |
| 6,454,293 B1 | | 9/2002 | Anderson |
| D465,895 S | | 11/2002 | Pfefferle et al. |
| 6,484,939 B1 | | 11/2002 | Blaeuer |
| 6,493,220 B1 | | 12/2002 | Clark et al. |
| 6,497,391 B1 | | 12/2002 | Timm |
| D468,420 S | | 1/2003 | Bolmsjo |
| 6,561,530 B2 * | | 5/2003 | Carbonero ............... 280/87.041 |
| 6,578,501 B1 | | 6/2003 | Moore |
| 6,615,744 B1 | | 9/2003 | Eckstein et al. |
| 6,626,445 B2 | | 9/2003 | Murphy et al. |
| 6,626,686 B1 | | 9/2003 | D'Souza et al. |
| D481,847 S | | 11/2003 | Van Landingham, Jr. |
| D482,173 S | | 11/2003 | Van Landingham, Jr. |
| 6,682,030 B2 | | 1/2004 | Santoro et al. |
| 6,683,784 B1 | | 1/2004 | Bidwell et al. |
| D486,915 S | | 2/2004 | Warschewske et al. |
| D487,178 S | | 2/2004 | Cuzzocrea |
| 6,721,178 B1 | | 4/2004 | Clark et al. |
| 6,722,673 B1 | | 4/2004 | Hamlin |
| 6,749,158 B2 | | 6/2004 | Timm |
| D497,462 S | | 10/2004 | Ryan |
| D500,575 S | | 1/2005 | Lucas |
| 6,860,494 B1 | | 3/2005 | Chisholm |
| 6,874,807 B1 | | 4/2005 | Labadie et al. |
| 6,883,439 B1 | | 4/2005 | Moore |
| 7,104,556 B1 | | 9/2006 | Young |
| 7,106,014 B1 | | 9/2006 | Mastalir et al. |
| 7,490,837 B2 | | 2/2009 | Pond et al. |
| 7,540,243 B2 | | 6/2009 | George et al. |
| 7,594,668 B2 | | 9/2009 | Arceta et al. |
| 2002/0125664 A1 | | 9/2002 | Eriksson et al. |
| 2002/0165641 A1 | | 11/2002 | Manalang et al. |
| 2003/0102784 A1 | | 6/2003 | Friar et al. |

FOREIGN PATENT DOCUMENTS

| | | |
|---|---|---|
| EP | 0 834 268 A2 | 4/1998 |
| WO | WO-01/97745 | 12/2001 |

OTHER PUBLICATIONS

Tremont Medical PCT-SC Ergonomically designed Trans-Mobile self-contained clinical computing workstation system Brochure (1997) 2 pp.

www.Ergotron.com; Mobile WorkCenter System brochure, 1997, 5 pp.

U.S. Appl. No. 60/369,858, filed Apr. 5, 2002, Warchewske et al.

Brochure Pages regarding Range of Motion; dtd Feb. 2002; 5 pp.

Ergotron® ErgoCart Optional Components; dtd Oct. 2001; 2 pgs.

Ergotron® HD Series Cart, Orderguide, dtd Feb. 1, 2003; 8 pp.

Ergotron® HD Series Cart; Product Bulletin; dtd Aug. 2002,6 pp.

Ergotron® Mobile Work Center Brochure, self contained computer workstation on wheels; dtd Apr. 9, 2003; 16 pp.

Ergotron® Mobile Work Center Brochure; dtd Jun. 2000; 16 pp.

Ergotron® Mobile Work Center Product Sheet; dtd Apr. 23, 2003; 2 pp.

Ergotron® Organizational solutions brochure; 2pp.

Ergotron®ErgoCart Product Bulletin; dtd Oct. 2001; 2pp.

*Flo Healthcare Solutions, LLC v. David Kappos (USPTO) and Rioux Vision, Inc.*, No. 2011-1476 (CAFC) DTD Oct. 23, 2012.

(56) References Cited

OTHER PUBLICATIONS iCart PointofCare Brochure (Lionville), Jun. 2004, 2 pages.
Notice of Allowance dated Jul. 7, 2005 received in corresponding U.S. Appl. No. 29/196,712.
Notice of Allowance dated Jun. 1, 2005 received in corresponding U.S. Appl. No. 29/196,714.
Notice of Allowance dated May 31, 2005 received in corresponding U.S. Appl. No. 29/196,713.
Notice of Allowance dated Nov. 17, 2004 received in corresponding U.S. Appl. No. 29/199,985.
Notice of Allowance dated Nov. 18, 2004 received in corresponding U.S. Appl. No. 29/199,984.
Notice of Allowance received in U.S. Appl. No. 12/193,346 dated May 20, 2009.
Office Action received in U.S. Appl. No. 10/783,030 dated Jun. 26, 2006.
Office Action received in U.S. Appl. No. 10/783,030 dated Feb. 19, 2008.
Office Action received in U.S. Appl. No. 10/783,030 dated Jun. 13, 2007.
Photo Image of EMS Cart With Optional Locking Drawers, 1 page.
*Rioux Vision, Inc.* v. *Flo Healthcare Solutions, LLC*, No. 2010-010026, 2011 WL 289281 (Bd.Pat.App.& Interf.)Appeal dtd Jan. 26, 2011.
Ritter Installation and Operation Manual for 345 Procedures Cart, 1998, 11 pages.
*Rubbermaid Incorporated d/b/a Rubbermaid Medical Solutions* v. *Ergotron, Inc.*; Defendant Ergotron Inc.'s First Amended Invalidity Contentions; Case No. 3:12-CV-00416-RJC-DSC; 2013 (W.D.N.C.).
*Rubbermaid Incorporated d/b/a Rubbermaid Medical Solutions* v. *Ergotron, Inc.*; Defendant Ergotron, Inc.'s Initial Invalidity Contentions; Case No. 3:12-CV-00416-RJC-DSC; 2013 (W.D.N.C.).
Supplemental Notice of Allowability dated Dec. 28, 2005 received in corresponding U.S. Appl. No. 29/196,713.
Supplemental Notice of Allowability dated Nov. 25, 2005 received in corresponding U.S. Appl. No. 29/196,712.
The Ergotron® ErgoCart Product Sheet, (2001); 4 pp.
US Notice of Allowance received in connection with U.S. Appl. No. 13/187,328 DTD May 14, 2012.
US Office Action on U.S. Appl. No. 12/550,771 DTD Jan. 28, 2011.
US Office Action on U.S. Appl. No. 12/550,771 DTD Jun. 24, 2011.
US Office Action on U.S. Appl. No. 13/544,922 DTD Feb. 5, 2013.
US Office Action received in connection with U.S. Appl. No. 13/187,328 DTD Jan. 12, 2012.
www.hoise.com/vmw/LV-VM-03-01-24.html; Virtual Medical Worlds, NorthEast Medical Center in North Carolina First to Test New EMS Mobile Clinical Workstation, Atlanta, Feb. 5, 2001, 2 pages.
www.infologixsys.com; InfoLogix Web Page Printouts for Mobile Cart Computing: Info Carts, Organizer Cart, Mobile Laptop/Integrated Flat Screen/Peripheral Cart, Variable Height Laptop Cart, SL-Cart and SL-Laptop Cart, © 2002-2003, 7 pages.
www.lionville.com/news1.html; Lionville Webpage Capture, Mar.-Apr. © 2004, 3 pages.
www.naware.com; NaWare Brochure, Nov. 5, 2001, 4 pages.

* cited by examiner

Fig. 3A
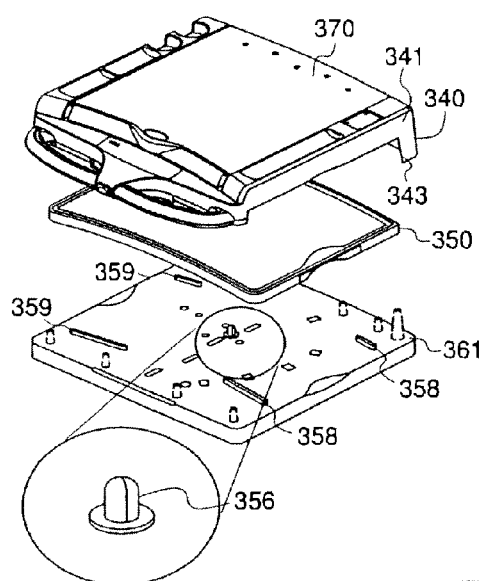
Fig. 3B
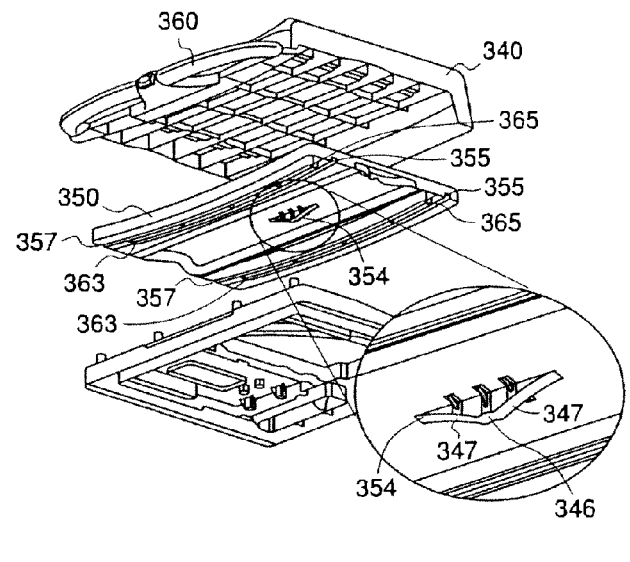
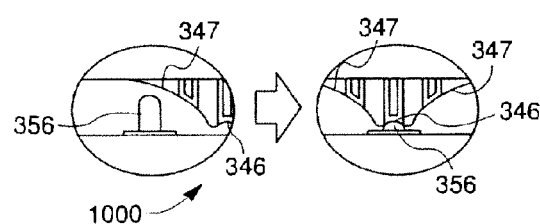
Fig. 3C

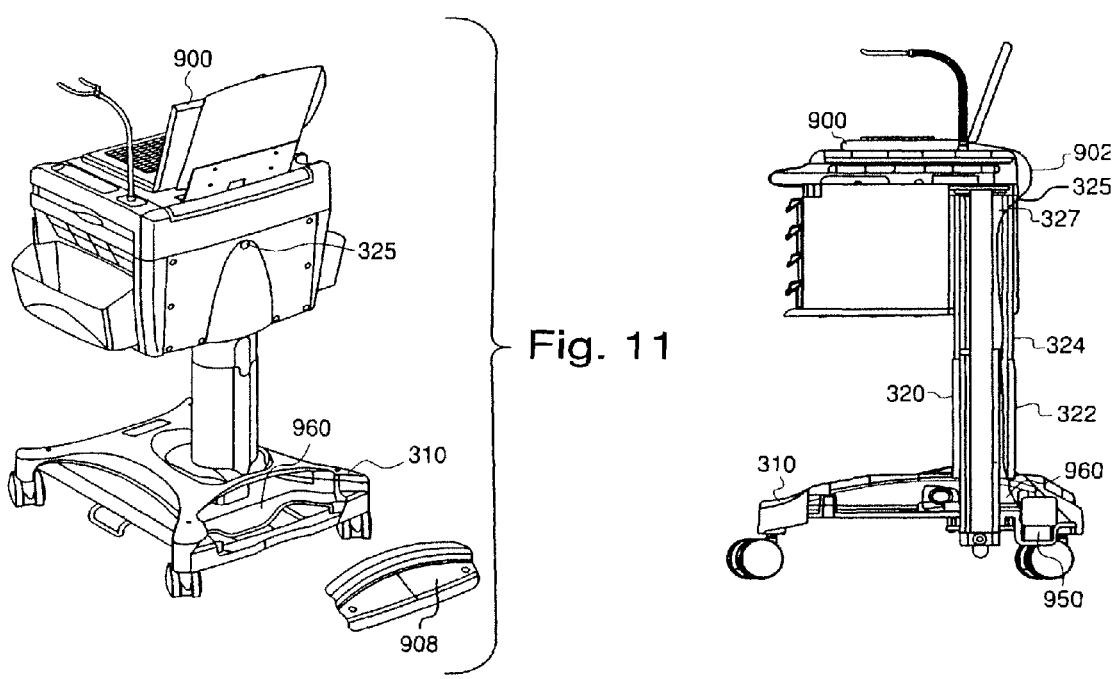

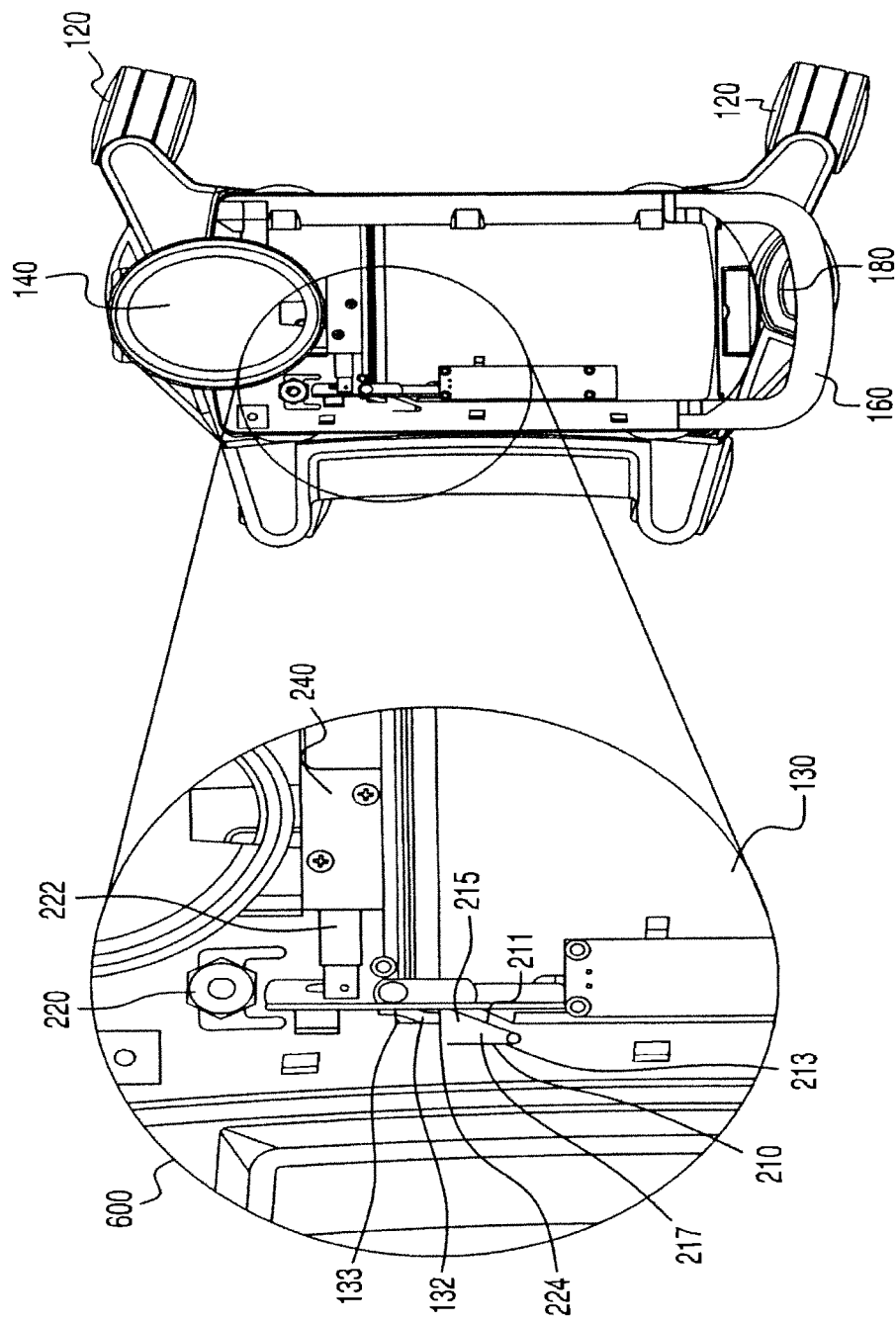

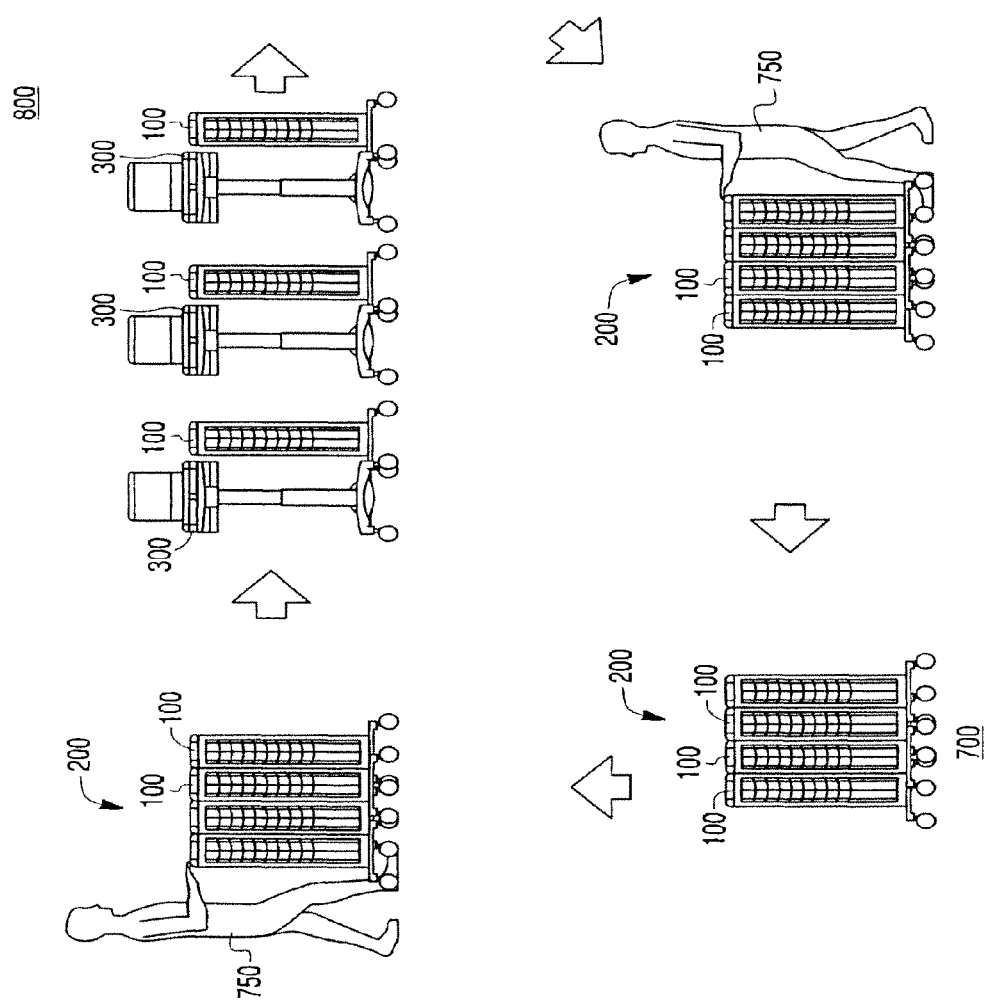

MEDICAL CART, MEDICATION MODULE, HEIGHT ADJUSTMENT MECHANISM, AND METHOD OF MEDICATION TRANSPORT

CROSS-REFERENCE TO RELATED APPLICATIONS

This application is a Divisional of U.S. application Ser. No. 13/544,922, filed Jul. 9, 2012, which is a Continuation of U.S. application Ser. No. 13/187,328, filed Jul. 20, 2011, incorporated herein by reference in its entirety, which is a Continuation of U.S. application Ser. No. 12/550,771, filed Aug. 31, 2009, incorporated herein by reference in its entirety, which is a Divisional of U.S. application Ser. No. 12/193,346, filed Aug. 18, 2008, incorporated herein by reference in its entirety, which is a Continuation of U.S. application Ser. No. 10/783,030, filed Feb. 23, 2004, incorporated herein by reference in its entirety, which claims priority from Provisional Application U.S. Application 60/448,920, filed Feb. 24, 2003, incorporated herein by reference in its entirety and which claims priority from Provisional Application U.S. Application 60/484,658, filed Jul. 7, 2003, incorporated herein by reference in its entirety and which claims priority from Provisional Application U.S. Application 60/518,649, filed Nov. 12, 2003, incorporated herein by reference in its entirety and which claims priority from Provisional Application U.S. Application 60/532,900, filed Dec. 30, 2003, incorporated herein by reference in its entirety and which is a Continuation-In-Part of U.S. application Ser. No. 29/196,712, filed Jan. 2, 2004, incorporated herein by reference in its entirety and which is a Continuation-In-Part of U.S. application Ser. No. 29/196,713, filed Jan. 2, 2004, incorporated herein by reference in its entirety and which is a Continuation-In-Part of U.S. application Ser. No. 29/196,714, filed Jan. 2, 2004, incorporated herein by reference in its entirety.

BACKGROUND OF THE INVENTION

The Institute of Medicine estimates that medical error is responsible for roughly 98,000 deaths annually, making it the seventh leading cause of death in the U.S. Accordingly, reducing the likelihood of error is an important issue not only for hospitals and doctors, but for society as a whole.

To alleviate some of these concerns, some hospitals provide nurses with medical carts on which a networked laptop computer facilitates the use of Electronic Medical Administration Records ("EMAR"). EMAR is an electronic record of medications and services administered by a healthcare professional through patient and medication identification via bar coding. When admitted into a hospital, the patient receives a bar coded wrist band for identification purposes. Also, healthcare professionals within the pharmacy bar code all the medications to be administered to the patients. Documentation of medications given at the point-of-care has reduced the number of errors by ensuring that the right patient is receiving the proper medication at the correct time. The EMAR software alerts the nurse if there is a discrepancy anytime during the medication administration process.

Unfortunately, however, these medical carts have proven unsatisfactory for a number of reasons. For example, the carts are not ergonomically designed. The average age of a nurse is 47 and roughly 83% of nurses report suffering chronic back pain. In addition, the existing EMAR carts suffer from a relative lack of work surface, lack of an area to dispose of refuse, bad placement of medication drawers, lack of storage space, and relative inability to be usefully raised and lowered to enable the nurse to work when either standing or sitting.

In many hospital environments, a nurse must walk to a central location (e.g., a pyxis machine) at which medication is handled to obtain medication for a particular patient. Often, to avoid giving the wrong medication to a patient, the nurse only carries one patient's medication at a time. This control, however, does not preclude the potential for the medication to be given to the wrong patient such as, for example, if the nurse is sidetracked and asks another nurse to administer the medication.

In addition to the above-mentioned concerns, when one takes into account the number of patients which a nurse must handle, the result is that the nurse must spend a considerable amount of time walking between the central location and each patient's bedside. This problem is exacerbated in some situations in which the central location is located a significant distance from one or more of the patients for which the nurse is responsible. Moreover, the cost associated with paying nurses to continuously travel to and from various medication locations may be relatively insignificant at the level of a particular nurse but is quite significant to the medical industry as a whole.

What is needed, therefore, is an apparatus and a methodology by which medical error may be reduced and by which the amount of time a nurse spends obtaining and researching medication may be reduced, without compromising safety.

SUMMARY OF THE INVENTION

An aspect of the present invention relates to a cart including a work platform having a work surface and at least one compartment, a base, and a height adjustment mechanism for adjusting the height of the work platform relative to the base. The compartment can be a drawer. The work platform can accommodate drawers of different sizes. Preferably the compartment is configured to be unlocked via a keyless entry system.

The work platform can include a laptop platform that can be moved in at least one of a forward and a rearward direction. The work platform also can include a work surface that can be moved in at least one of a leftward and rightward direction. The work platform also can include a barcode scanner holder.

The cart can include a plurality of rolling members connected to the base. The work platform can include sidewalls and the rolling members can be disposed on the base outside of the sidewalls.

Another aspect of the present invention includes a cart system comprising a first cart and a second cart. The first cart can include at least one compartment and a base having rolling members to permit movement of the first cart. The second cart can include a plurality of compartments and a base having rolling members to permit movement of the second cart. The first and second cart can include linking structure that permits the first and second carts to be connected together for movement.

The first cart can include a work platform having a work surface and that houses the at least one compartment. The first cart can include a plurality of compartments.

Preferably the base of the first cart is configured to nest with the base of the second cart. The second cart can include a housing for supporting the plurality of compartments and the rolling members can be disposed on the base outside of the sidewalls.

Another aspect of the present invention relates to a method of medication transport. The method can include the steps of loading, at a first location, medication into first and second carts, connecting the first and second carts to form a cart train, moving the cart train to a second location when loaded with medication, separating the first and second carts after moving the cart train to the second location, moving the first cart from the second location to a third location, removing medication from the at least one cart at the third location, and returning the first and second carts to the first location.

Another aspect of the present invention relates to a method of medication transport comprising the steps of loading, at a first location, medication into a compartment(s) in a medication module(s), moving the medication module to a second location, transferring medication from the medication module to a medical cart, and administering medicine from the medical cart to a patient.

Another aspect of the present invention relates to a method of medication transport comprising the steps of loading, at a first location, medication into a compartment(s) in a medication module(s), moving the medication module to a second location, exchanging the compartments of the medication module(s) with the compartments of a medical cart(s) at the second location, returning the medication module(s) having the compartments of the medical cart(s) therein to the first location for refilling while the medical cart(s) having the compartments of the medication module(s) therein are being taken to patients.

These and other features, aspects, and advantages of the present invention will become more apparent from the following description, appended claims, and accompanying exemplary embodiments shown in the drawings.

BRIEF DESCRIPTION OF THE DRAWINGS

FIGS. 3A and 3B are top and bottom exploded perspective views of three panels of a sliding platform of the medical cart of FIG. 1;

FIG. 3C is an enlarged view of a connection mechanism of the sliding platform of FIGS. 3A and 3B FIGS. 4A and 4B are top plan views of the assembled sliding platform in which the platform has been pulled out to the right (FIG. 4A) and to the left (FIG. 4B);

FIG. 11 is a rear perspective view of the medical cart of FIG. 1 having a laptop computer thereon and showing a hatch being removed;

FIG. 12 is cross-sectional side view of the medical cart of FIG. 1;

FIGS. 23 and 23A show a cross-sectional top view of the medication module of FIG. 17 showing a portion of a keyless entry system, and a blow-up view of the keyless entry system of FIG. 23, respectively; and FIG. 24 is a diagram of steps for an embodiment of a method of medication transport according to the present invention, which can be performed using a plurality of medication modules of the type shown in FIG. 17 and a plurality of medical carts of the types shown in FIGS. 1 and 16.

DETAILED DESCRIPTION

Figure 1:
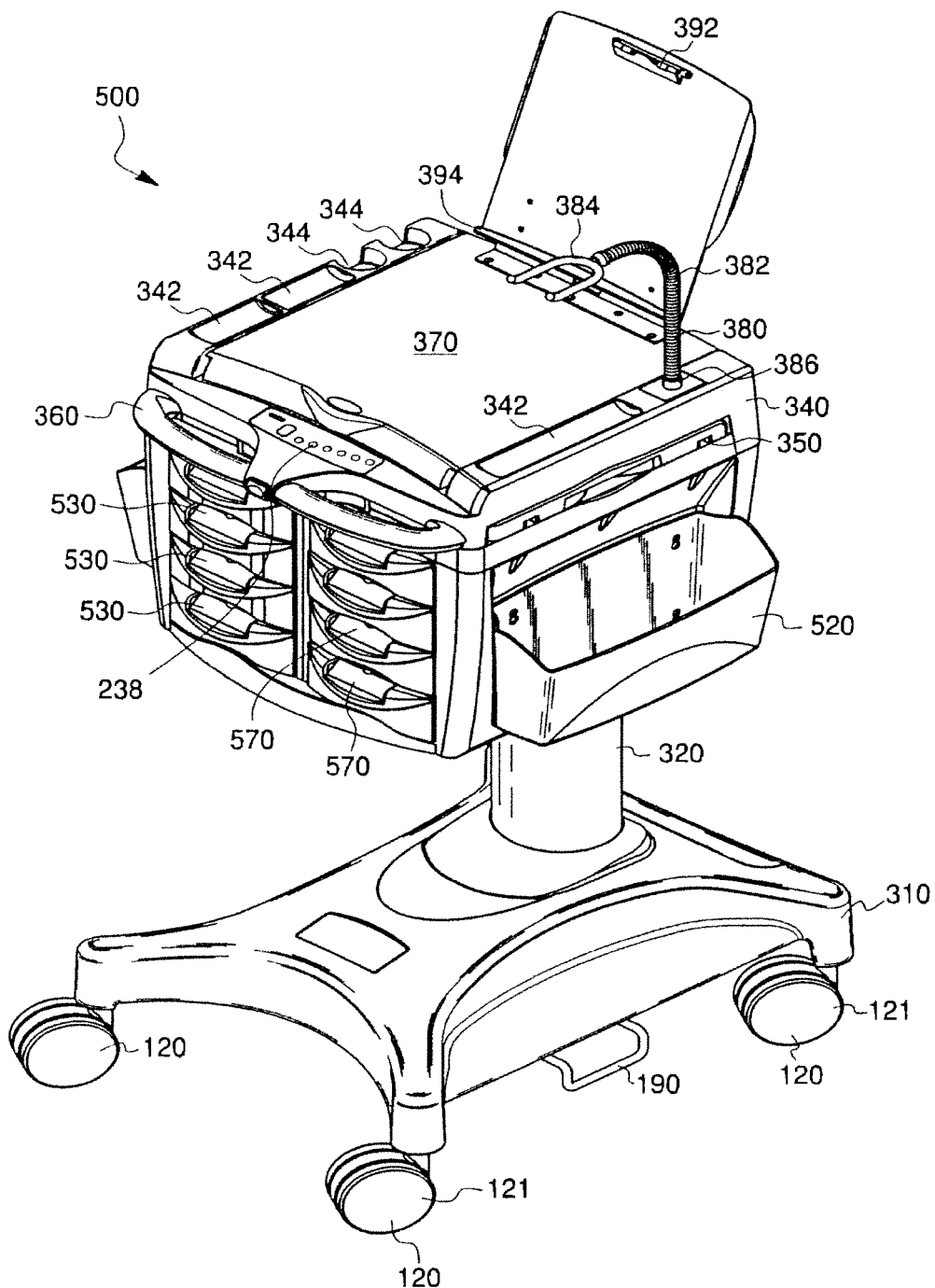
FIG. 1 is a perspective view of a first embodiment of a medical cart according to the present invention.

Presently preferred embodiments of the invention are illustrated in the drawings. An effort has been made to use the same or like reference numbers throughout the drawings to refer to the same or like parts.

A first embodiment of a medical cart 500 is shown in FIGS. 1-15. With respect to FIG. 1, it can be seen that the medical cart 500 includes a work platform 340, a support mechanism 320 that supports and adjusts the height of the work platform 340, and a base 310.

The work platform 340 can include a bi-directional laptop platform 370, a bi-directional work surface 350, an adjustable barcode scanner holder 380, an adjustable clipboard 390, one or more lockable compartments 530, a plurality of top bins 342, removable side bins 520, cup holders 344, and/or a keypad 238. Because each of these items is provided on the work platform 340, a user can ergonomically access each of these items as the work platform 340 is raised or lowered.

Figure 6A:
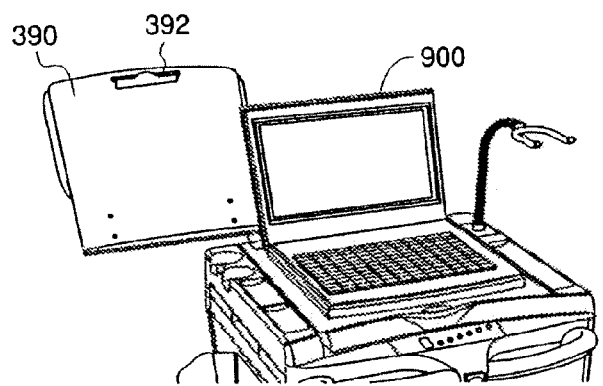
FIGS. 6A-6C are perspective views of a clipboard of the medical cart of FIG. 1.
Figure 7:
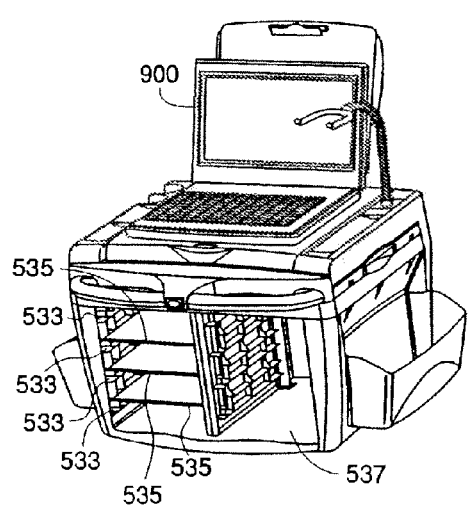
FIG. 7 is a perspective view of a work platform of the medical cart of FIG. 1 without compartments.

The laptop platform 370 can be configured to support, for example, a laptop computer 900 (shown in FIGS. 6A and 7). Conventional structure can be provided on the laptop platform 370 to hold the laptop computer in place. The laptop platform 370 can have an arcuate front face 376 at a front portion. The arcuate front face 376 may be designed to correspond to the torso of a user for ergonomic reasons.

Figure 2A:
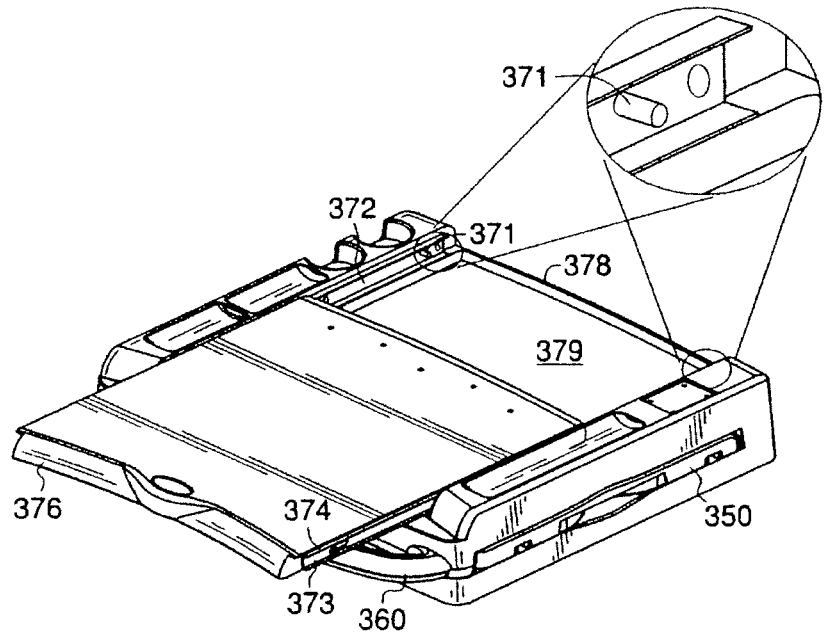
FIGS. 2A and 2B are perspective views of a slidable laptop computer surface of the medical cart of FIG. 1, the laptop surface being moveable forward (FIG. 2A) and rearward (FIG. 2B)
Figure 2B:
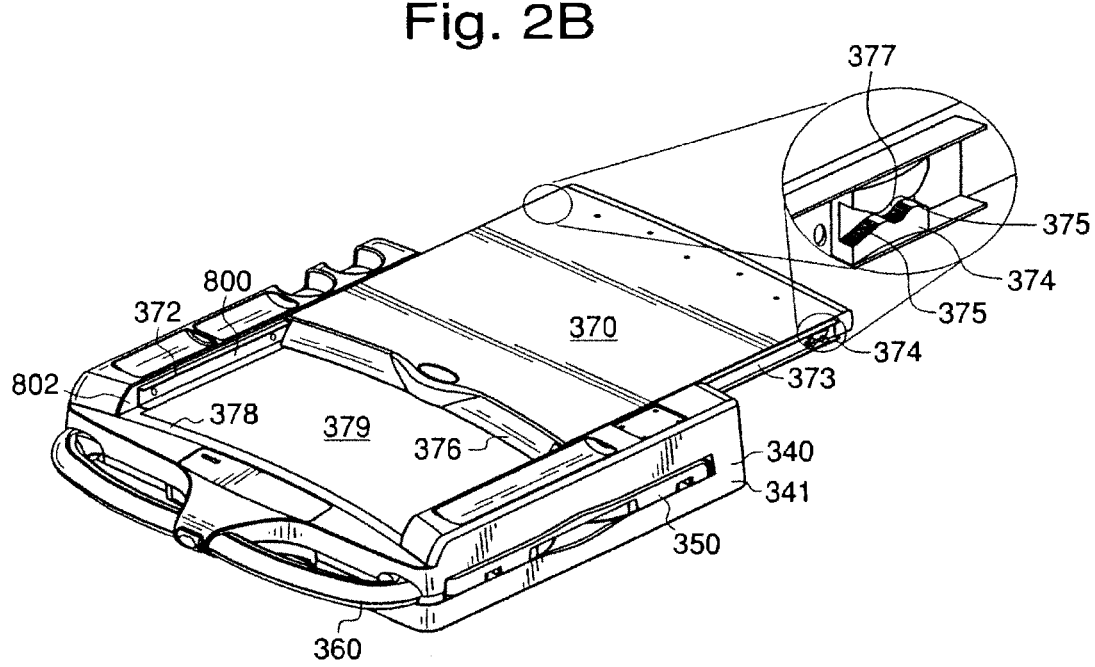

The laptop platform 370 can be locked in a central position (FIG. 1) or adjusted ergonomically to a forward (FIG. 2A) or rearward (FIG. 2B) position. As an example of a use of the present invention, when a user lowers the work platform 340 to a low position and moves the laptop platform 370 to a forward position, the user can sit and the work platform 340 functions as a desk. A transfer structure 800 allows the laptop platform 370 to be moved between those positions. The transfer structure 800 can include stationary rails 372 mounted on body portions 802 of the work platform 340 and rails runners 373 mounted on the laptop platform 370, as shown in FIGS. 2A and 2B.

Notches 374, which include sloped surfaces 375 and cavities 377, are formed along the rail runners 373. The notches 374 are configured to engage posts 371 formed along the stationary rails 372. When the laptop platform 370 is moved by the transfer structure 800, the sloped surfaces 375 of the notches 374 are configured to engage the posts 371. By continuing to push (or pull) the laptop platform 370, the posts 371 will ride up the sloped surfaces 375 and be deposited in cavities 377 in the notches 374, thereby releasably immobilizing the laptop platform 370 with respect to the work platform 340.

In one embodiment, one notch 374 may be provided on each of the rail runners 373 and corresponding posts 371 may be provided on the stationary rails 372. As a result, the laptop platform 370 can be releaseably locked with respect to the work platform 340. For example, as shown in FIGS. 2A and 2B, the posts 371 may be provided at rear portions of the stationary rails 372 and the notches 374 may be similarly provided at rear portions of the rail runners 373. As a result, the laptop platform 370 will be releaseably locked with respect to the work platform 340 when in a central position shown in FIG. 1.

In another embodiment, each of the stationary rails 372 may include at least three posts 371, one provided at each end of the stationary rails 372 and one provided in a central portion of the stationary rails 372. Correspondingly, each of the rail runners 373 may include three notches 374, one provided at each end of the rails runners 373 and one provided in a central portion of the rail runners 373. As a result, the surface 370 can be releasably immobilized with respect to the work platform 340 in a forward position (FIG. 2A), a rearward position (FIG. 2B), and a central position (FIG. 1). In the forward position (FIG. 2A), the rearmost notches 374 may be engaged with the forwardmost posts 371. Similarly, in the rearward position (FIG. 2B), the forwardmost notches 374 may be engaged with the rearmost posts 371. Finally, in the central position, all three posts 371 on each stationary rail 372 may be engaged with the corresponding cavity 377 of the notches 374 of the rail runners 373.

In another embodiment, the contact between the stationary rails 372 and the rail runners 373 can be frictionally enhanced such that the laptop platform 370 does not readily slide with respect to the work platform 340. Rather, force (i.e., either pushing or pulling on the laptop platform 370) will be required to overcome the frictional engagement between the stationary rails 372 and the rail runners 373. As a result, the laptop platform 370 can be relatively fixed with respect to the work platform 340 at any location between a forwardmost position (FIG. 2A) and a rearmost position (FIG. 2B). In addition, one or more notches 374/posts 371 may be combined with the frictional engagement between the stationary rails 372 and the rail runners 373.

When the laptop platform 370 is pushed forward or rearward, it can expose a secondary work area 379 provided below the laptop platform 370. The secondary work area 379 can be particularly sturdy. For example, it can be sturdy enough to enable a user to crush pills on the secondary work area 379. In addition, the secondary work area 379 may be provided with a rim 378. The rim 378 may reduce the likelihood of medication rolling off the medical cart 500 such as, for example, when a nurse tries to crush pills on the secondary work area 379.

The bi-directional work surface 350 is shown in FIGS. 3A, 3B, 3C, 4A, and 4B. As shown in FIGS. 3A and 3B, the bi-directional work surface 350 is positioned below the laptop platform 370. The bi-directional work surface 350 is designed to move through a slot 343 in the side 341 of the work platform 340 in leftward and rightward directions to provide additional work space.

Figure 4A:
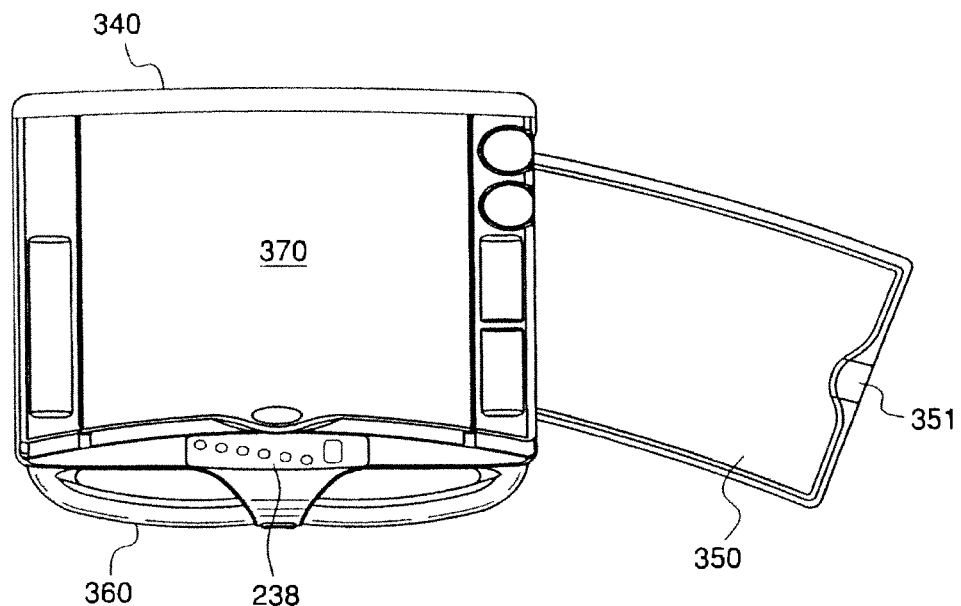

The work surface 350 can have channels 355, 357 on its underside that engage ribs 358, 359 formed on a plate 361 provided on a body 329 of the work platform 340. The channels 355, 357 are sized to receive the ribs 358, 359 of the plate 361. To prevent the bi-directional work surface 350 from sliding off the plate 361, the channels 355, 357 are closed at one end. As a result, when the second bi-directional work surface 350 slides to the right (as shown in FIG. 4A), the channels 355 will slide along the ribs 358, 359. At one point, the channels 355 will slide past the ribs 359 on the left side of the plate 361 and will continue to slide along ribs 358 on the right side of the plate 361. The second bi-directional work surface 350 will stop sliding, however, when the closed ends 363 of the channels 355 abut the inner ends of ribs 358.

Figure 4B:
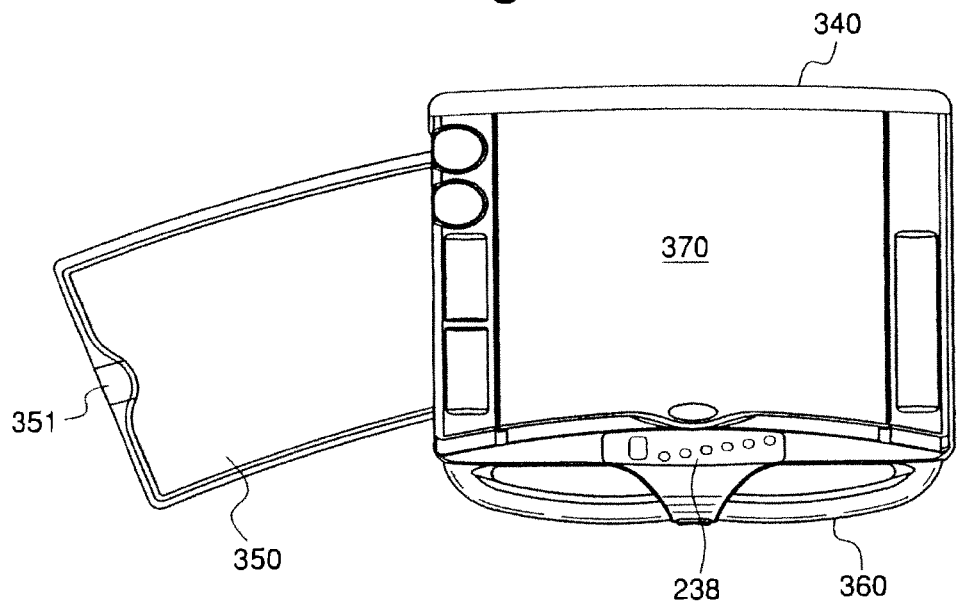

Similarly, when the second bi-directional work surface 350 slides to the left (as shown in FIG. 4B), the channels 357 will slide along the ribs 358, 359. At one point, the channels 357 will slide past the ribs 358 on the right side of the plate 361 and will continue to slide along ribs 359 on the left side of the plate 361. The second bi-directional work surface 350 will stop sliding, however, when the closed ends 365 of the channels 357 abut the inner ends of the ribs 359.

When the bi-directional work surface 350 slides to the right or to the left, it slides in an arcuate path as a result of the channels 355, 357 and ribs 358, 369 (and the work surface 350) being arcuate in shape. As a result, the second bi-directional work surface 350 is positioned closer to a user standing or sitting in front of the medical cart 500 when it is in an extended position.

A releaseable locking mechanism 1000 (shown best in FIG. 3C) can be provided to hold the work surface 350 in a center position and to prevent it from sliding unintentionally. For example, as shown in FIGS. 3B and 3C, the second bi-directional work surface 350 may be provided with a projection 354 having sloped surfaces 347 and a nesting region 346. Correspondingly, the plate 361 may be provided with a moveable pin 356 which may be, for example, a ball spring plunger that is spring-biased in upward direction (i.e., toward the work surface 350). As a result, when the bi-directional work surface 350 is pushed into the work platform 340 (from either the left or the right), the moveable pin 356 will initially be pushed downward relative to the plate 361 by the sloped surface 347 of the projection 354. Subsequently, the pin 356 will extend upwards into the nesting region 346 of the projection 354 and become frictionally engaged therein, thereby releasably locking the work surface 350 with respect to the work platform 340. To move the work surface 350 out of the locked position, a force is applied to one of the exposed ends of the second bi-directional work surface 350 (to push the moveable pin 356 out of the nesting region 346 of the curved projection 354), thereby enabling the bi-directional work surface 350 to slide freely along the ribs 358, 359.

Of course, the type of locking mechanism may be changed. Further, additional movable pins 356 may be provided in the plate 361 so as to enable the second bi-directional work surface 350 to be releasably locked in a corresponding number of positions.

Figure 5A:
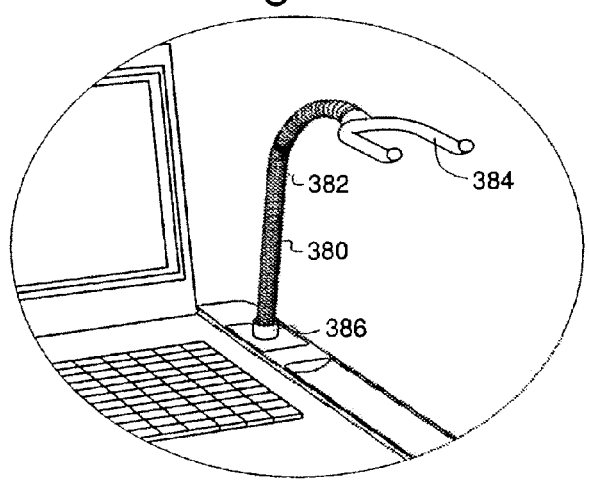
FIGS. 5A-5C are close-up views of a barcode scanner and barcode scanner holder of the medical cart of FIG. 1.
Figure 5B:
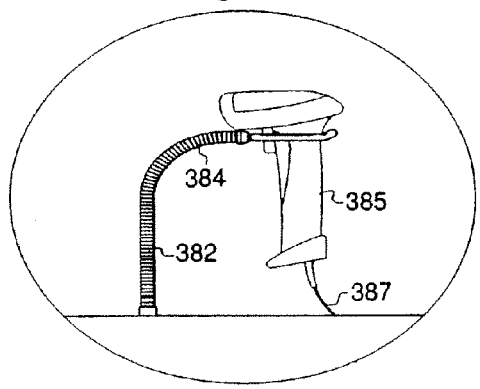
Figure 5C:
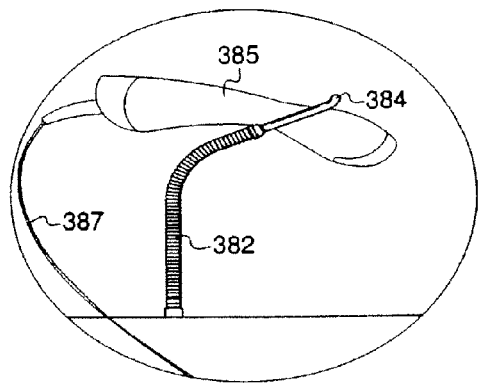

As shown in FIGS. 5A-5C, the adjustable barcode scanner holder 380 includes a flexible neck 382, a base 386, and a holder portion 384. As a result of the neck 382 being flexible, the position of the holder portion 384 can be adjusted. For example, the vertical distance between the holder portion 384 and the laptop platform 370 can be adjusted. Specifically, the orientation of the holder portion 384 can be adjusted between, for example, a holding position in which a barcode scanner 385 is maintained in an upright holding position (FIG. 5B) and a hands-free scanning position in which the holder portion 384 is adapted to hold an inverted (i.e., facing downward) barcode scanner 385. By holding the scanner 385 in the inverted position, the holder portion 384 enables a user to pass documents between the scanner 385 and the laptop platform 370 (FIG. 5C), without having to manually hold the scanner 385 (i.e., the scanner 385 may be operated in a hands-free manner). Moreover, the flexibility of the neck 382 enables the holder portion 384 to be adjusted to accommodate various barcode scanner sizes. In addition, the neck 382 is designed to rotate at the base 386 thereof so that a user can turn the barcode scanner holder 380 away from the laptop platform 370, if desired.

The barcode scanner 385 may be an integral part of the medical cart 500 or may be detachable therefrom. If the barcode scanner 385 is an integral component of the medical cart 500, its power cord 387 may be inserted into a power cord passage 327 and connected to an electrical receptacle 904, as later explained in detail with respect to FIGS. 11-13. By way of contrast, the barcode scanner 385 may receive the power necessary to operate it from a laptop computer 900 when it is plugged into a USB port of the laptop computer 900.

Figure 6B:
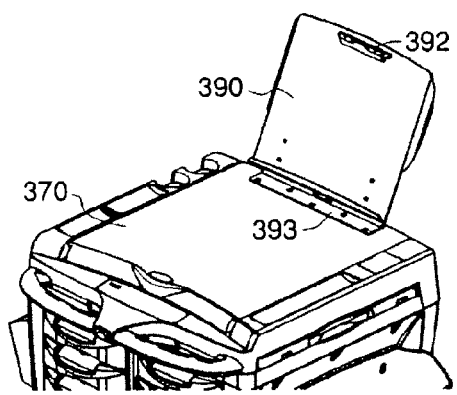
Figure 6C:
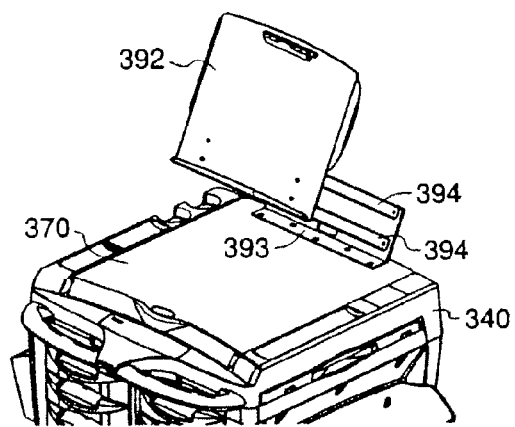

As shown in FIGS. 6A-6C, the adjustable clipboard 390 is also designed to hold items in a hands-free manner. The clipboard 390 includes a clip 392 for holding items, such as paper. The clipboard 390 also includes conventional rails 394 attached to an L-shaped metal bracket 393 which connects the clipboard 390 to the laptop platform 370, as shown best in FIG. 6C. The clipboard 390 is designed to slide along the rails 394 to the left of the medical cart 500. As a result, if a user is working on a laptop computer provided on the laptop platform 370, the clipboard 390 can be moved from a central position (FIG. 6B) to left of the laptop computer to allow the user to view the documents clipped to the clip 392, as shown in FIGS. 6A and 6C. Of course, in other embodiments, the clipboard 390 could be designed to move to the right.

The plurality of compartments 530 face the user and move up and down with the work platform 340 (i.e., they remain in the same position relative to the laptop platform 370), which are ergonomically desirable features. The compartments 530 may be provided with labeling portions 570, which allow labels to be displayed on the compartments 530. The plurality of compartments 530 enable a user (e.g., a nurse) to separately maintain medication for particular patients or for a particular room. For example, if a nurse is responsible for eight patients in a hospital ward, the medical cart 500 may be provided with a corresponding number of compartments 530 and the medication for each patient may be kept in a separate drawer assigned to that patient. As a result, the nurse could load the medication for all eight patients into eight separate drawers at one time (e.g., at the start of a medication pass) and at one location (e.g., at a pyxis machine), thereby reducing the need to travel to obtain the medication during the nurse's shift.

Figure 8:
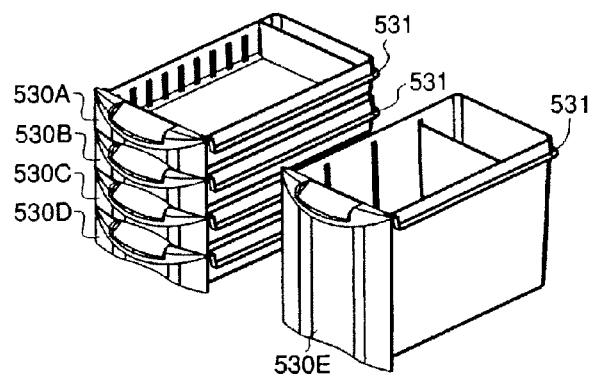
FIG. 8 is a perspective view of different sized compartments configured to be inserted into the medical cart of FIG. 1.
Figure 9A:
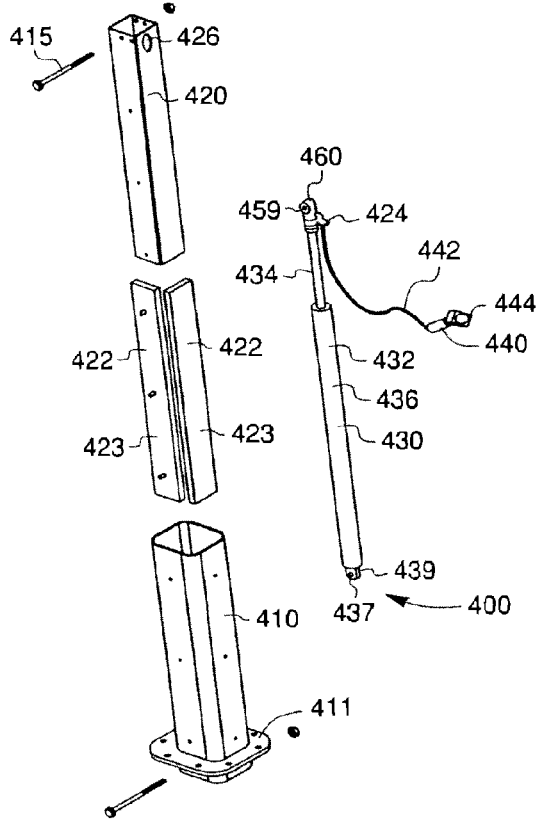
FIG. 9A is an exploded view of parts of a height adjustment mechanism of the medical cart of FIG. 1.
Figure 9B:
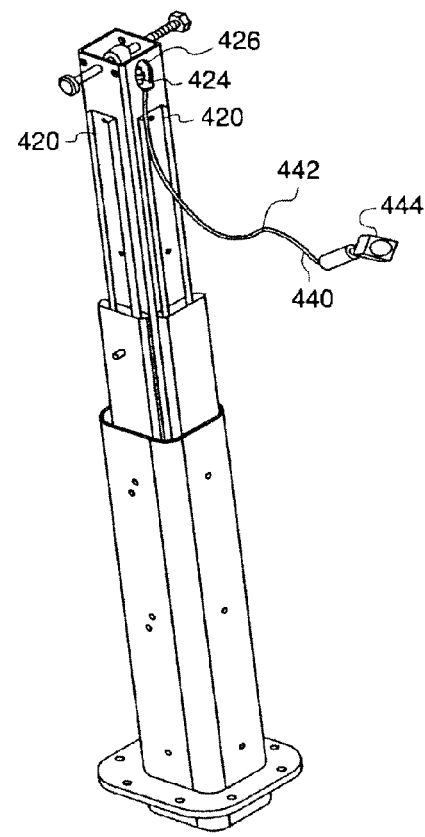
FIG. 9B is a perspective view of the height adjustment mechanism of FIG. 9A in assembled form.

As shown in FIGS. 7 and 8, the compartments 530 have projections 531 which are configured to slide in grooves 533 formed on the interior walls of the medical cart 500. Although the compartments 530 in FIG. 1 are shown as having a generally uniform height, this is not required. In some embodiments the compartments 530 may have different heights.

For example, as shown in FIG. 7, four short compartments 530A-D can be removed, thereby exposing dividers 535 (which may be, for example, sheet metal). By removing the dividers 535 (e.g., by sliding them out of the medical cart 500), as shown in the left side of the medical cart 500 in FIG. 7, a tall space 537 may be created. As a result, a tall compartment 530E, the height of which is substantially equal to height of the four short compartments 530A-D when installed in the medical cart 500, may be inserted into medication module 500 to substantially fill the space 537. Moreover, the tall compartment 530E will readily slide into the medical cart 500 by means of the projections 531 which are configured to slide into the grooves 533 previously occupied by the projections 531 of the upper short compartment 530A. Thus, different size compartments 530 can be accommodated based on the desired application.

Figure 22:
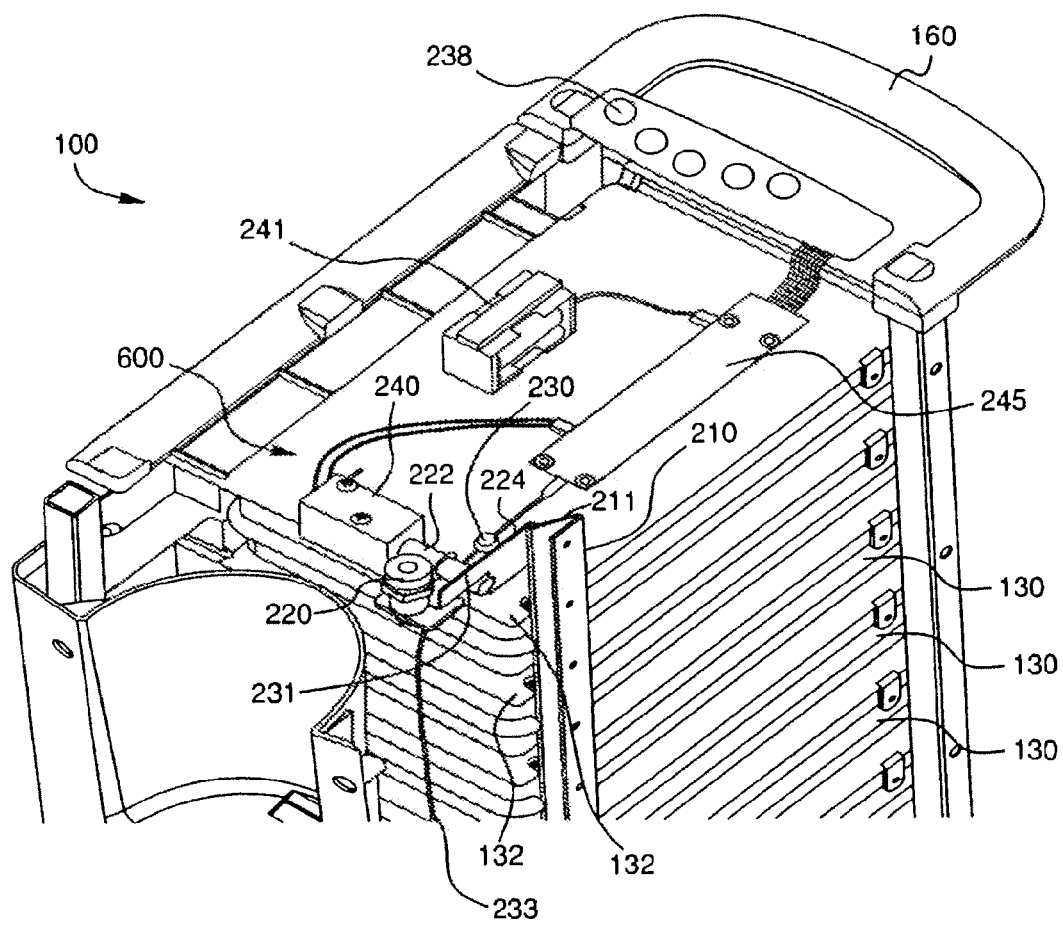
FIG. 22 is a breakaway perspective view of the medication module of FIG. 17 showing a portion of a keyless entry system.

The compartments 530 may be lockable by means of a keyless entry system (the details of which are later described with respect to FIGS. 22 and 23). Thus, the potential for unauthorized access to the compartments 530 while the nurse is caring for a particular patient is small.

The top bins 243 are provided to house items such as paperclips, pencils, etc. Similarly, the cup holders 344 are provided to secure a number of medicine cups used to pass out medications.

The removable side bins 520 can be provided to hold items, such as trash or medical equipment. The side bins 520 can be removably connected to the sides of the body 329 of the work platform 340 by conventional means, such as a hole and pin arrangement.

The work platform 340 may be raised and lowered by means of the support mechanism 320. This provides a sitting or standing user with easy access to the work surface 350 and its associated components (e.g., laptop platform 370, work surface 350, compartments 530, etc.). The support mechanism 320 allows the user to adjust the position of the work platform 340 to a comfortable position, regardless of whether the user is sitting or standing. The support mechanism 320 comprises two telescoping portions 322, 324 (shown more clearly in the embodiment shown in FIG. 16) and height adjustment mechanism 400 (shown in FIGS. 9A and 9B). The height adjustment mechanism 400 enables a standing user or a sitting user to ergonomically raise and lower the work platform 340.

The height adjustment mechanism 400 includes an outer casing 410, a telescoping inner casing 420, and a driver 430. Preferably, two or more drawer slides 422 are provided between the inner casing 420 and the outer casing 410. Although two drawer slides 422 may be used (on opposite sides of the inner casing 420), it is preferable to use at least three drawer slides 422, to prevent (or at least greatly inhibit) a binding action from being applied to the height adjustment mechanism 400 by means of a cantilevered force being applied thereto.

The drawer slides 422 may be, for example, conventional drawer rails formed of stationary drawer rails 423 and corresponding rail runners 425. If the drawer slides 422 are conventional drawer rails, one side of the drawer slides 422 (e.g., the rail runners 425) may be fixed to outer sides of the inner casing 420 and the corresponding side of the drawer slides 422 (e.g., the stationary drawer rails 423) may be fixed to inner sides the outer casing 420. Further, the stationary drawer rails 423 may be provided with ball bearings to facilitate movement of the rail runner 425. An upper end of one side of the inner casing 420 is provided with an engagement mechanism 426. As shown, the engagement mechanism may be in the form of a window in the side of the casing 420.

The driver 430 includes a gas driven piston 432 which, in turn, includes a body portion 436 and a telescoping strut 434.

The driver 430 is controlled by an actuator 440 to which is connected by a connector 442.

Figure 10A:
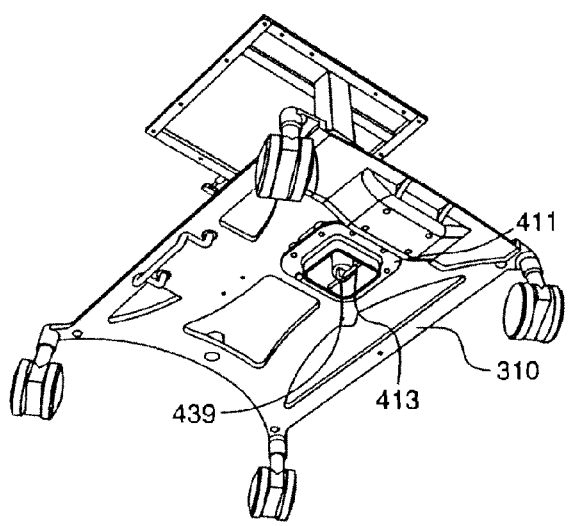
FIGS. 10A and 10B are bottom and top perspective views of the height adjustment mechanism of FIGS. 9A and 9B being connected to the medical cart of FIG. 1.
Figure 10B:
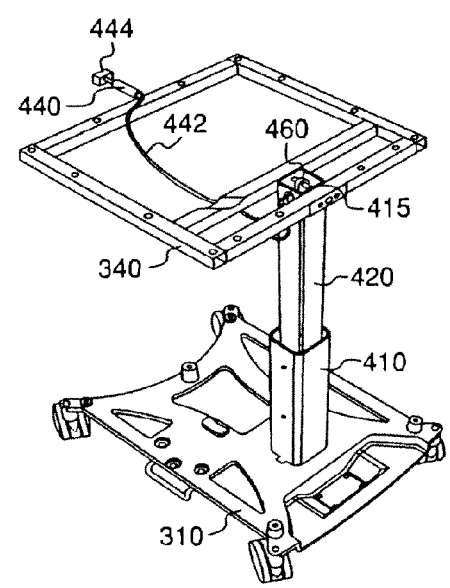

As shown in FIG. 10A, a base 411 of the outer casing 410 is affixed to the base 310 of the medical cart 500 by a plurality of bolts through the base 411. A bolt 413 passes through a hole 437 in a connection portion 439 of the body portion 436 of the piston 432, thereby immobilizing both the outer casing 410 and the piston 432. In addition, as shown in FIG. 10B, the inner casing 420 and the telescoping strut 434 are affixed to work platform 340 by an upper bolt 415 which passes through the inner casing 420 and through a hole 459 in a connection portion 460 of the telescoping strut 434. As a result, when the work platform 340 is raised or lowered, the strut 434 and the inner casing 420 are correspondingly raised or lowered.

As shown in FIG. 10B, the actuator 440 may be provided in a front portion of the medical cart 500. Moreover, a button 444 of the actuator 440 may be provided in the handle 360 of the medical cart 500, as shown in FIG. 1. To lower the work platform 340, the button 444 is pushed as a user pushes down on work platform 340 thereby causing the gas driven piston 432 to expel air. As a result, the telescoping strut 434 is withdrawn vertically into the body portion 436 of the piston 432. As the telescoping strut 434 moves downward into the body portion 436, the work platform 340 which is affixed to the telescoping strut 434 also moves downward. In turn, the work platform 340 forces the connection portion 460 and the inner casing 420 to move downward. If the button 444 is released while the work platform 340 is being lowered, the work platform 340 will be releaseably locked at the height at which the button 444 is released. As a result, the work platform 340 can be releaseably locked at any position between a lowest position (at which the telescoping strut 434 is maximally provided in the body portion 436 of the piston 432) and a highest position (at which the inner casing 420 is driven upward to a maximum distance by the telescoping strut 434 of the piston 432).

By way of contrast, to raise the work platform 340, a user merely needs to push button 444 and lift upward on the work platform 340. As the work platform 340 is light in weight, it will readily move upward. Moreover, in the process, the gas driven piston 432 will intake air, thereby enabling the work platform 340 to remain at the raised level, i.e., when the platform 340 is raised gas will be sucked into the piston 340 and will not be readily expellable until the button 444 is depressed. In other words, similar to the process of lowering the work platform 340, when the work platform 340 is raised it may be releaseably locked at any position between the lowest position and the height position by releasing the button 444. As a result, each component of the work platform 340 (including the bi-directional laptop platform 370 and the compartments 530) is ergonomically available to a user when sitting or standing.

Figure 13:
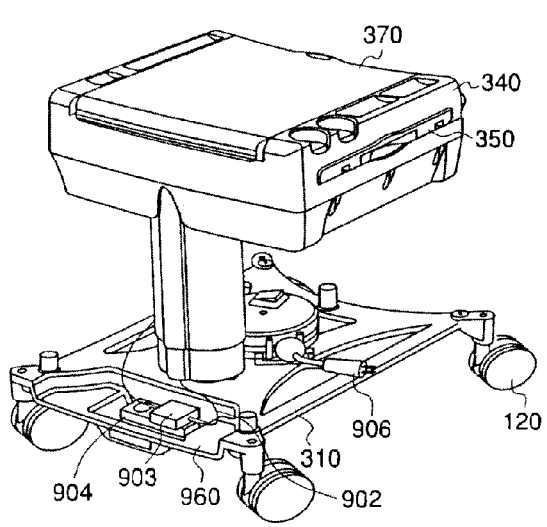
FIG. 13 is a rear perspective view of the medical cart of FIG. 1 having both a hatch and a base cover removed.
Figure 14:
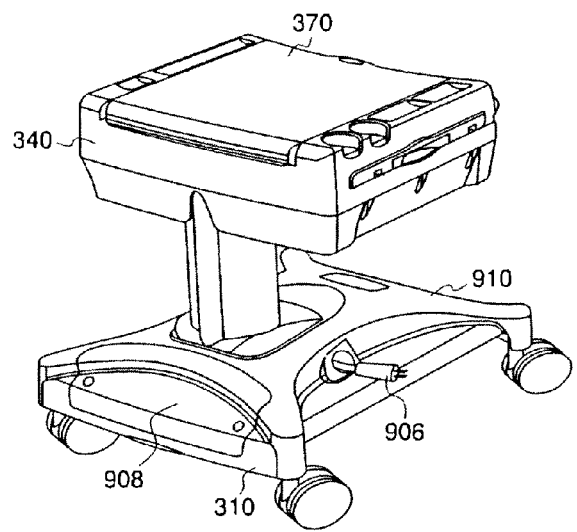
FIG. 14 is a rear perspective view of the medical cart of FIG. 1 showing a retractable power cord.
Figure 15:
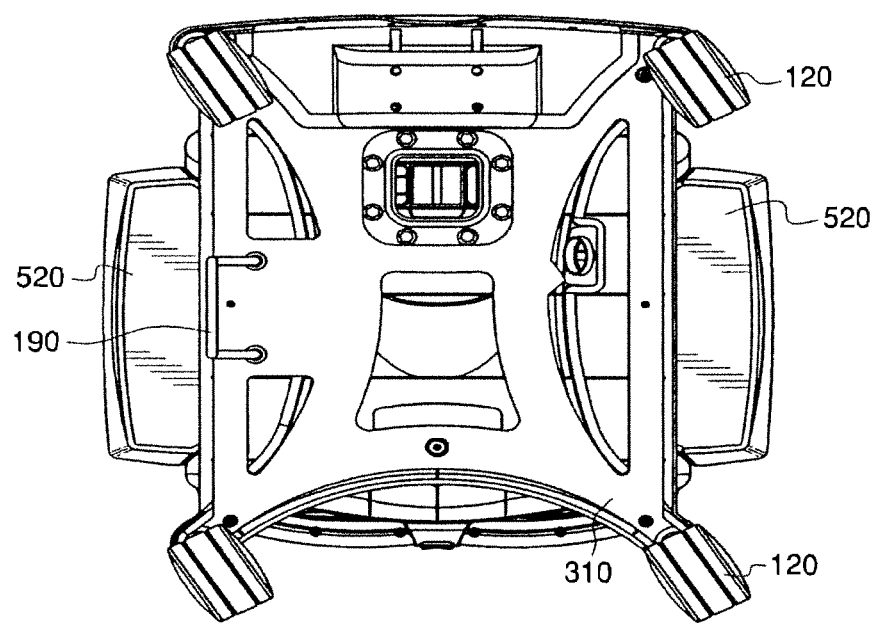
FIG. 15 is an underside plan view of the medical cart of FIG. 1 showing a first locking mechanism.

In addition, as shown in FIGS. 12 and 13, the medical cart can include a power cord passage 327 that enables a power cord 902 of a laptop computer 900 (or other device) on the laptop platform 370 to be electrically connected to an electrical receptacle 904 provided in the base 310. The electrical receptacle 904 can be connected, for example to a wall outlet via a retractable cord 906, as later described. Preferably, the passage 327 includes an access hole 325 in the work platform 340 and extends through the telescoping portions 322, 324. The passage 327 terminates in a well 960 in the base 310 where the electrical connection can occur. This permits the point of connection to the electrical receptacle 904 to be enclosed.

As shown in FIG. 13, the well 960 in the base 310 houses the electrical receptacle 904, a retractable cord 906, and a hatch 908 that provides access to the well 960 so that power cords 387, 902 can be plugged into the electrical receptacle 904. The retractable cord 906 can be plugged into an external wall outlet to recharge the battery internal to the laptop computer 900 and/or a battery-powered solenoid 240 in the keyless entry system (later described in detail). The hatch 908 works in conjunction with a cover plate 910 to enclose the base 310 including the well 960, thereby encapsulating the components provided in the base 310 and shielding them from the environment.

The base 310, which is moveable by means of rolling members 120 (e.g., casters), is ergonomically shaped to provide stability. The base 310 is designed to provide stability by having the rolling members 120 at corners which are outside of the footprint of the work platform 340. Moreover, the rolling members 120 are spaced-apart to such a degree that two rolling members 123 of a medication module 100 can be located between two rolling members 121 of the base 310, thereby enabling the medical cart 500 and the medication module 100 to nest together. Further, when the medical cart 500 is nested with a medication module 100, it may be releaseably connected to the medication module 100 by means of a second locking mechanism 190 provided on an underside of the base 310 (shown in FIGS. 1 and 15), also as later described in detail.

Figure 16:
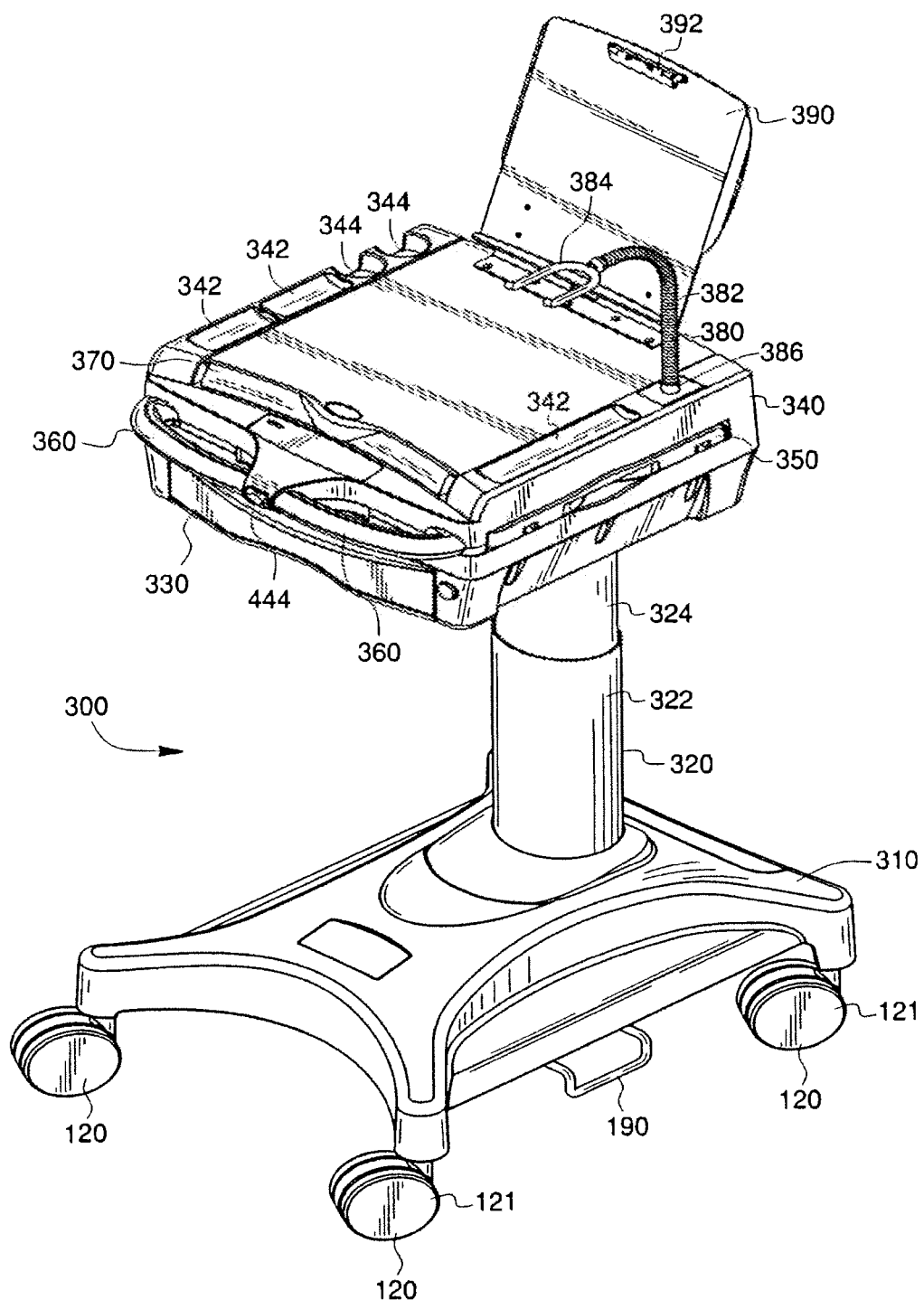
FIG. 16 is a perspective view of a second embodiment of a medical cart according to the present invention.

Another embodiment of a medical cart 300 is shown in FIG. 16. In this embodiment, the removable side bins 520 of the previous cart 500 have been removed to facilitate joining the medical cart 300 with a medication module 100. The medical cart 300, like the medical cart 500 shown in FIG. 1, also includes a second locking mechanism 190 which may be used to connect the medical cart 300 to a medication module 100. In addition, the cart 300 contains fewer compartments 330 which may, like the compartments 530 of the medical cart 500 shown in FIG. 1, be lockable by means of a keyless entry system or by a conventional key lock.

Figure 17:
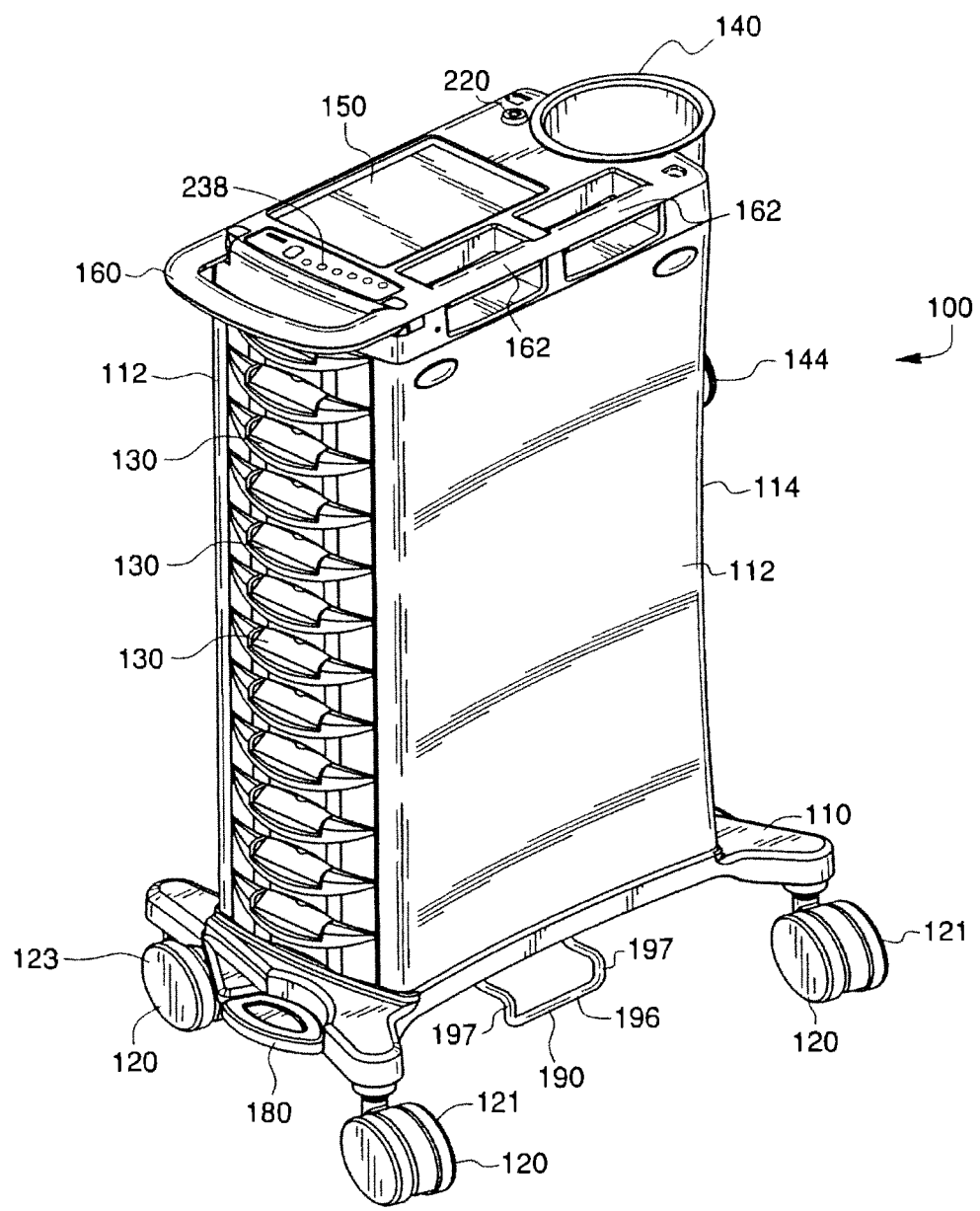
FIG. 17 is a perspective view of a first embodiment of a medication module according to the present invention.
Figure 18:
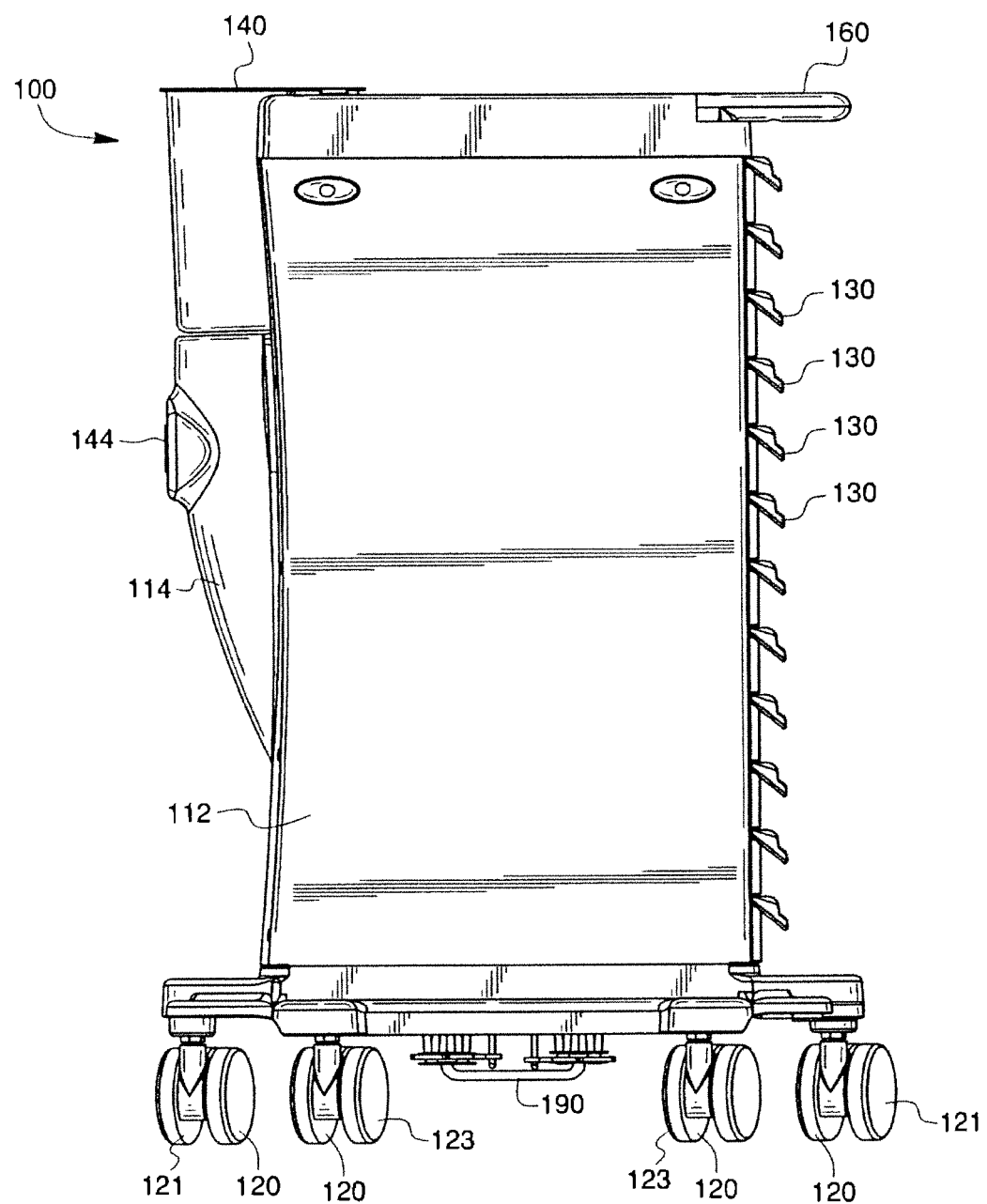
FIG. 18 is a side plan view of the medication module of FIG. 17.

One embodiment of a medication module 100, which may be referred to as a cart, is shown in FIGS. 17-23A. As shown in FIG. 17, the medication module 100 includes a component body 111 having a plurality of lockable compartments 130 and which is supported by a base 110. The medication module also may include a refuse container 140, a depression work surface 150, a retractable power cord 144 (shown best in FIGS. 18 and 21B) which can be used to recharge a battery 241 of a keyless entry system 600 by means of a power cord 233 (as later described in detail), a front handle 160, and a side handle 162. The two handles 160, 162 are provided so that the medication module can be pushed by a user standing in front of the compartments 130 or in front of the sidewall 112.

The component body 111 includes two side walls 112 and a back wall 114. The walls 112, 114 support a plurality of compartments 130 which, for example, may be in the form of drawers. Although the compartments 130 are shown as having a generally uniform height, this is not required. Moreover, in some embodiments the compartments 130 may have different heights. As a result, a plurality of short compartments 130 may be replaced by a tall compartment 130 in the manner previously described with respect to the first medical cart 500 embodiment.

It is preferable to provide the user with the ability to lock the compartments 130, of the medication module 100. To reduce the likelihood of losing a key, to reduce the likelihood of having a key getting stuck (or worse broken) in a lock, and to eliminate the need for a separate lock for each compartment 130, the compartments may be lockable by a keyless entry system 600, as hereafter described with respect to FIGS. 22 and 23.

The keyless entry system 600 includes a solenoid 240 (powered by a battery 241 which is electrically connected, by means of the power cord 233, to the retractable power cord 144), a printed circuit board ("PCB") 245, a piston 222, a spring-biased hinge 210 (which has an active side 211 and a stationary side 213), a keypad 238, and an actuating lever 224 which is connected to the piston 222 at a connection point 231 and which pivots around an axis of rotation defined by a pin 230.

The hinge 210 can be, for example, a hinge conventionally known as a piano hinge. In a locked orientation, the active side 211 of the hinge 210 is provided in an engagement position 215 in which the active side 211 is positioned to engage a notch 132 formed on a compartment 130 (i.e., each compartment 130 has a similar notch 132), if a user attempts to withdraw the compartment 130. In other words, as a result of the engagement between the active side 211 of the spring 210 and the notches 132 of the compartments 130, the compartments 130 can not be readily withdrawn out of the medication module 100.

To unlock the compartments 130, a user first enters a security code using buttons of the keypad 238 (to verify access to the medication module 100) and may, if required, then enter an unlock code on the keypad 238. In response, the PCB 245 sends an unlock signal to the solenoid 240. When the unlock signal is received by the PCB 245, the solenoid 240 withdraws the piston 222, thereby causing the end of actuating lever 224 in contact with the active side 211 of the spring 210 to swing outward on the pin 230. As a result, the actuating lever 224 causes the active side 211 of the spring 210 to swing out of the engagement position 215 and into a disengagement position 217. In other words, the active side 211 swings toward the stationary side 213 of the spring 210 so that the two sides 211, 213 rest against each other. When the sides 211, 213 of the spring 210 rest against each other, the notches 132 of the compartments 130 will no longer be inhibited by the active side 211 of the spring 210. As a result, the compartments 130 may be readily removed from the medication module 100.

The compartments 130 can be relocked by pressing a "lock" button (not labeled) on the keypad 238 or by entering a lock code on the keypad 238; in either case, the PCB 245 will send a lock signal to the solenoid 240 instructing it to outwardly push the piston 222, thereby causing the end of the actuating lever 224 in contact with the active side 211 of the spring 210 to swing inward on the pin 230. As a result, the active side 211 of the spring 210 will swing back into the engagement position 215 by means of the spring-biased nature of the spring 210. In addition, and as a safety means, a timer may be provided in the keypad 238, PCB 245, or in the solenoid 240 which will, when a timer count is satisfied, automatically instruct the piston 222 to be outwardly pushed, thereby causing the active side 211 of the spring 210 to retract into the engagement position 215.

If a compartment 130 is removed when either a lock signal is sent to the solenoid 240 or when a timer count is satisfied (and the active side 211 of the spring 210 is provided in the engagement position 215), the compartment 130 may be inserted into the medication module without entering an unlock code. Specifically, the notches 132 of the compartments 130 have sloped faces 133 thereon which, when the compartment 130 is pushed into the medication module 100, will abut the active side 211 of the spring 210. By continuing to push the compartment 130, the sloped face 133 will cause the active side 211 of the spring 210 to collapse into the disengagement position 217, i.e., the spring-bias of the spring 210 will be overcome. After the sloped face 133 passes the active side of the spring 210, the active side 211 will snap back into the engagement position 215 (by means of the spring-bias), thereby locking the compartment 130 in the medication module 100.

An additional safety (and access) measure may be provided to address a situation in which the keypad 238 fails or the battery powered solenoid 240 loses power. Specifically, the compartments 130 may be unlocked manually by a hard (back-up) lock 220, as shown in FIGS. 17 and 23. By means of the hard lock 220, a key can be used to manually rotate the actuating lever 224, thereby pushing the active side 211 of the spring 210 or enabling it to swing outward under the force of the spring bias. In other words, the key can be used to move the active side 211 manually out of the engagement position 215 or to allow the active side 211 to swing (under the spring-biased force) into the engagement position 215.

Although the keyless entry system 600 has been described with respect to the medication module 100, the same system 600 can be applied to the compartments 330, 530 of the medical carts 300, 500, respectively.

As a result of the ability to lock the compartments 130, 330, 530, a nurse can use a medication module 100 and/or medical cart 300, 500 to deliver medication to various patients, without worrying about unauthorized access to the compartments 130, 330, 530 while attending to a particular patient. Moreover, as a result of the keypad 238, a nurse does not have to worry about losing a key, except for the hard lock key which may be kept at a central location.

The base 110, which is supported by a plurality of rolling members 120 (e.g., casters), is designed to provide stability to the frame 111, similar to the base 310 of the medical cart 300, 500. However, the base 110 is also designed such that the two of the rolling members 121 on one side of the module 100 are spaced apart farther than the two rolling members 123 on the other side of the module 100. As a result, when two medication modules 100 (or a medication module 100 and a medical cart 300, 500) are brought together, the closer spaced rolling members 123 of one module 100 can fit between the farther spaced rolling members 121 of the other module 100 (or medical cart 300, 500), thereby enabling the modules 100 (or module 100 and medical cart 300, 500) to nest closer together to form a train 200.

As a result of the ability to nest the bases 110 of a plurality of consecutive medication modules 100 in a train 200 (as later described in detail), the sidewalls 112, 112 of adjacent modules 100 can be positioned in close proximity, thereby creating a small footprint for the train 200. Similarly, as a result of the ability to nest the base 110 of a medication module 100 and the base 310 of a medical carts 300, 500, the compartments of the medication module 100 can be in close proximity to the work platform 340 of the medical cart 300, 500, thereby providing a user with easy access thereto.

Figure 19:
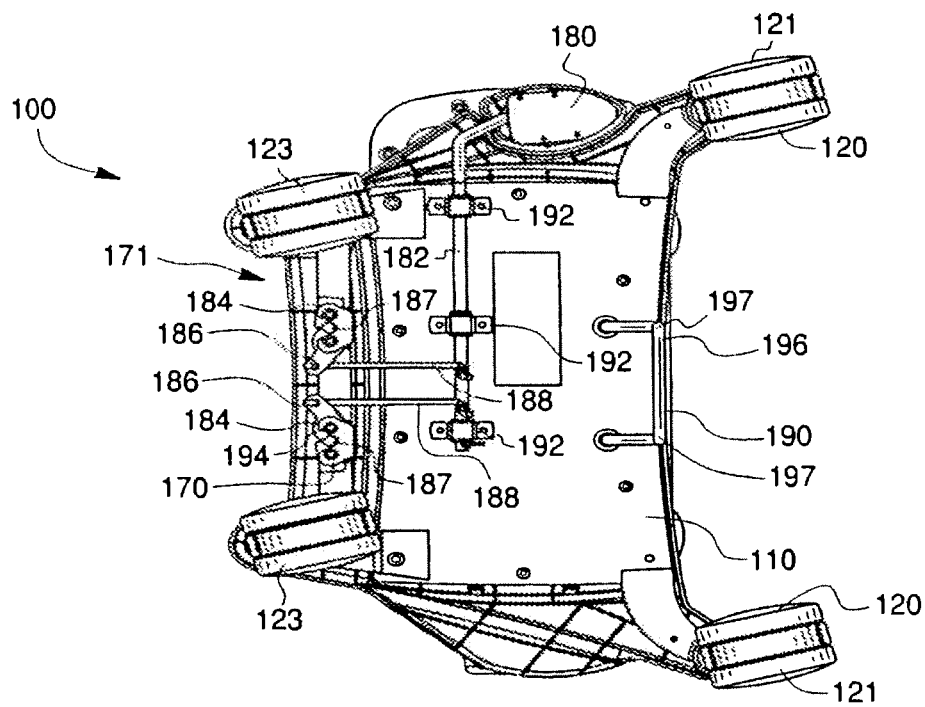
FIG. 19 is an underside plan view of the medication module of FIG. 17 showing first and second locking mechanisms.
Figure 20:
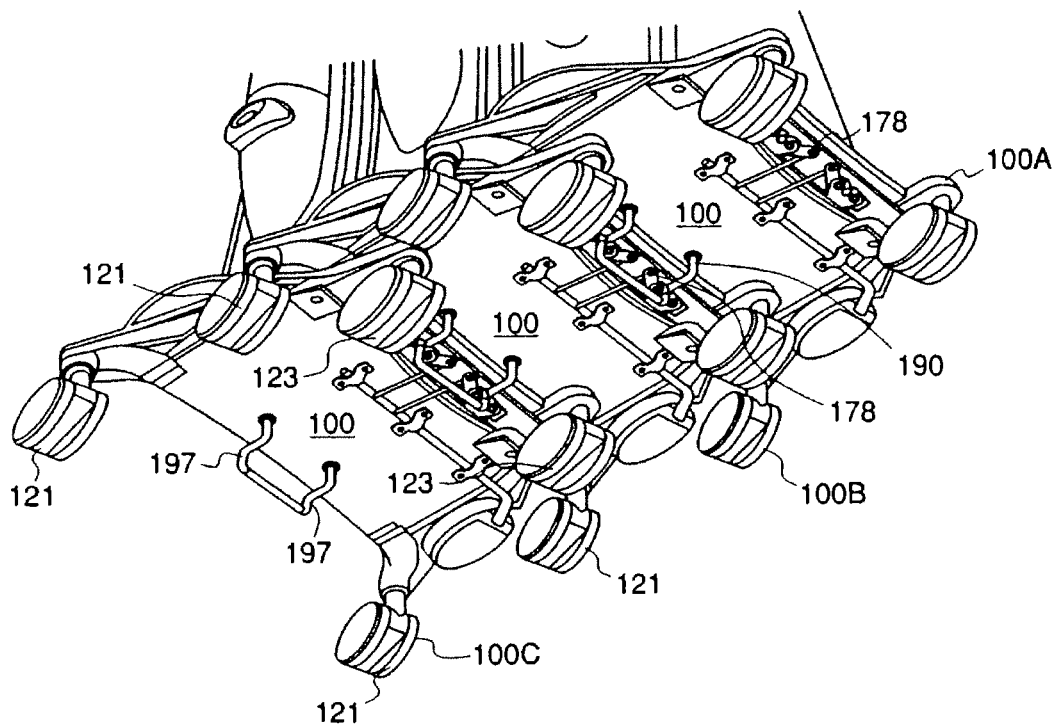
FIG. 20 is an underside perspective view of a plurality of medication modules of the type shown in FIG. 17 releaseably engaged to form a train.

To releaseably link the nested medication modules 100 (or a medication module 100 and nested a medical cart 300, 500), the base 110 of the medication module 100 is provided with a connection mechanism 171. The connection mechanism 171 includes an actuator 180, a first locking mechanism 170, and a second locking mechanism 190, as best shown in FIGS. 19 and 20. The actuator 180, which may be in the form of a foot pedal, includes a pivot rod 182. When the foot pedal 180 is depressed, the pivot rod 182 is configured to rotate within rings 192 from a resting position to an active position, thereby activating the first locking mechanism 170.

The first locking mechanism 170 includes beams 188, cover plates 186 having sloped surfaces 194, and catches 184 which comprise cavities 187. When the rod 182 of the actuator 180 rotates, it pulls the beams 188 toward the center of the base 110. In turn, the beams 188 cause the cover plates 186 to rotate toward the center of the base 110. As the cover plates 186 rotate, they expose the cavities 187 in the catches 184. Correspondingly, when the actuator 180 is released, the rod 182 rotates back to the resting position, thereby pushing the beams 188 away from the center of the base 110 and, in turn, rotating the cover plates 186 to enclose the cavities 187.

When the cavities 187 are closed, they are designed to releaseably contain posts 197 of a second locking mechanism 190 of another medication module 100 or of a medical cart 300, 500. In addition, although the posts 197 may be provided separately on the base 110, 310, of the medication module 100 and medical carts 300, 500, they are preferably integrally formed by means of a crossbar 196. Regardless of the design of the posts 197, they enable a medication module 100 to be joined to another medication module 100 to form a train 200, as shown in FIG. 20.

A train 200 of medication modules 100A-100C can be formed by releaseably aligning the posts 197 of a second locking mechanism 190 of one medication module 100A with the cover plates 186 of a first locking mechanism 170 of an adjacent medication module 100B. By pushing the modules 100A, 100B toward each other, the posts 197 will slide along the sloped surfaces 194 of the cover plates 186, thereby causing the cover plates 186 to rotate. As the cover plates 186 rotate, the cavities 187 will be exposed and the posts 197 will slide into them. After the posts 197 slide into the cavities 187, the cover plates 186 will retract, thereby locking the posts 197 in the cavities. Of course, to add a third medication module 100C, the posts 197 of the second medication module 100B would be similarly inserted into the cavities 187 of the third medication module 100C.

Figure 21B:
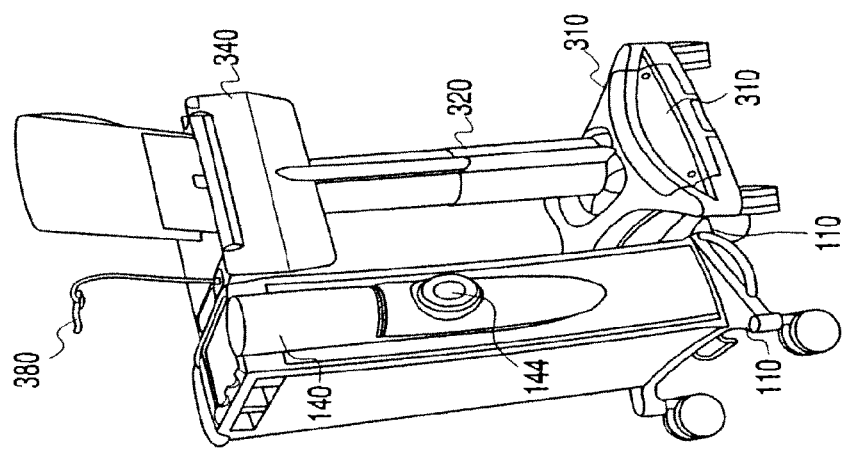
FIGS. 21A and 21B are front and back perspective views of a medical cart of the type shown in FIG. 16 releaseably engaged with a medication module of the type shown in FIG. 17.
Figure 21A:
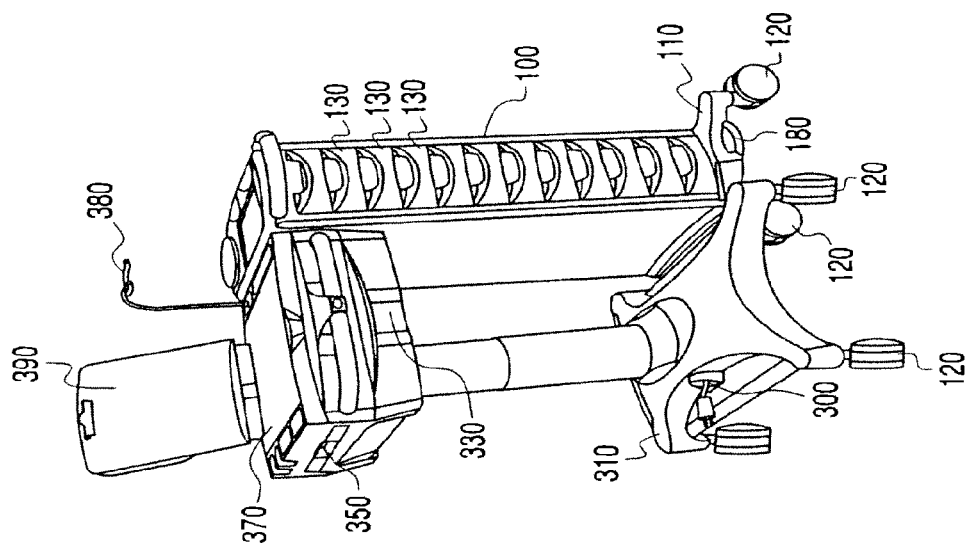

As the medical carts 300, 500 also include second locking mechanisms 190, the medication module can be releaseably joined with the medical carts 300, 500. For example, as shown in FIGS. 21A and 21B, the medication module 100 can be releaseably joined with the medical cart 300 shown in FIG. 16. Of course, to release the medication module 100 from the medical carts 300, 500, a user (e.g., a nurse) would depress the foot pedal actuator 180 (shown in FIG. 21A) to disengage the first locking mechanism 170 formed under the base 110 of the medication module 100 and the second locking mechanism 190 formed under the base 310 of the medical cart 300, 500.

As shown in FIG. 24, a train 200 of medication modules 100 can be loaded with medication at a central location (e.g., pharmacy) 700; the number of medication modules 100 may depend on the number of medical carts 300, 500 that a hospital has on a particular floor on which the medication is to be delivered. A pharmacy technician can then drive the train 200 to a second location 800 at which the individual medication modules 100 can be separated from the train 200. In addition, the medication modules 100 may be joined (by means of the first connection mechanism 171 thereon) to a medical cart 300, 500 (by means of the second locking mechanism 190 thereon). One or more nurses 750 can then drive the separated medication modules 100 (with or without a medical cart 300, 500 affixed thereto) to respective third locations (not shown) at which the nurse may administer medication (contained in the compartments 130) to a distinct plurality of patients. When the nurse(s)'s rounds are complete, the empty medication modules 100 can be separated from attached medical carts 300, 500 (if any) and rejoined to form a train 200 of medication modules 100. The train 200 of medication modules 100 may then be returned to the central location 700 for refilling so that the method of medication transport may be repeated.

Similar to the aforementioned method, a modification may be made. Specifically, there may arise situations in which a nurse 750 does not want to push a combined medication module 100 and medical cart 300, 500 but wants to enjoy the functionality of the medical cart 300, 500. In these situations, the nurse 750 may unlock the compartments 130 of medication module 100 at the second location 800 and remove one or more compartments 130. The removed compartments 130 could then be exchanged with compartments 530 in the medical cart 500 or placed on the work platform of the medical cart 300 so that the medical cart 300, 500 then contains the medications which the nurse 750 needs to deliver.

If the compartments 130 of the medication module 100 are exchanged with the compartments 530 of the medical cart 500, the medication modules 100 containing the empty compartments 530 of the medical carts 500 may then be taken back to central location 700 for refilling while the original medication is being taken by nurses to the patients, so that the method of medication transport can be repeated.

Although the aforementioned describes embodiments of the invention, the invention is not so restricted. It will be apparent to those skilled in the art that various modifications and variations can be made to the disclosed embodiments of the present invention without departing from the scope or spirit of the invention. Accordingly, these other medication modules, medical carts, height adjustment mechanisms, keyless entry systems, and methods of medication transport are fully within the scope of the claimed invention. Therefore, it should be understood that the apparatuses and methods described herein are illustrative only and are not limiting upon the scope of the invention, which is indicated by the following claims.

What is claimed is:

1. A cart system comprising:
 a first cart including:
  a housing,
  at least one compartment located between two side walls of the housing of the first cart, and
  a base having rolling members to permit movement of the first cart, wherein the base of the first cart has a first footprint covering a first area; and
 a second cart including:
  a housing,
  at least one compartment located between two side walls of the housing of the second cart, and
  a base having rolling members to permit movement of the second cart,
  wherein the base of the second cart has a second footprint covering a second area,
 wherein a linking structure that permits the first and second carts to be connected together for joint movement is partially disposed on each of the first and second carts, and
 wherein the first cart is configured to nest with the second cart when the first and second carts are connected to each other such that the housing of the first cart runs alongside and parallel to the housing of the second cart and a footprint of the connected first and second carts covers an area that is less than a sum of the first and second areas,
 wherein two rolling members of the first cart overlap with the second area when the first and second carts are connected to each other,
 wherein the linking structure comprises a first locking mechanism on the first cart having cover plates and catches forming cavities, and a second locking mechanism on the second cart having posts configured to be contained within the cavities.

2. The cart system of claim 1, wherein the housing of the second cart is a work platform having a work surface positioned above the at least one compartment of the second cart in a vertical direction.

3. The cart system of claim 1, wherein the at least one compartment of the first cart includes a plurality of compartments; and wherein the at least one compartment of the second cart includes a plurality of compartments.

4. The cart system of claim 1, wherein the first and second carts have a same height, and wherein the first footprint is the same as the second footprint.

5. The cart system of claim 1, wherein the two rolling members of the first cart entirely fit within the second area when the first and second carts are connected to each other.

6. The cart system of claim 1, wherein the linking structure further contains an actuator configured to rotate the cover plates so as to expose the cavities to the posts during joining of the first and second carts.

7. The cart system of claim 6, wherein the actuator comprises a foot pedal and a pivot rod, wherein the first locking mechanism comprises beams connected to the pivot rod and cover plates, and wherein when the foot pedal is depressed, the pivot rod is configured to rotate such that the beams are pulled toward a center of the base of the first cart, which causes the cover plates to rotate toward the center of the base of the first cart, thus exposing the cavities in the catches.

8. The cart system of claim 7, wherein, when the foot pedal is released, the pivot rod is configured to rotate back to a resting position, thereby pushing the beams away from the center of the base of the first cart, which rotates the cover plates to enclose the cavities.

9. The cart system of claim 1, further comprising a third cart;
wherein the third cart includes a housing, at least one compartment located between two side walls of the housing of the third cart, and a base having rolling members to permit movement of the third cart;
wherein another linking structure that permits the first and third carts to be connected together for, joint movement is partially disposed on each of the first and third carts; and
wherein the first cart is configured to nest with the third cart when the first and third carts are connected to each other such that the housing of the first cart runs alongside and parallel to the housing of the third cart.

10. The cart system of claim 9, wherein the first, second, and third carts have a same height, wherein the base of the third cart has a third footprint, and wherein the first, second, and third footprints are the same.

11. A cart system comprising:
a first cart including:
a housing,
at least one compartment located between two side walls of the housing of the first cart, and
a base having rolling members to permit movement of the first cart; and
a second cart including:
a housing,
at least one compartment located between two side walls of the housing of the second cart, and
a base having rolling members to permit movement of the second cart,
wherein a linking structure that permits the first and second carts to be connected together for joint movement is partially disposed on each of the first and second carts,
wherein the first cart is configured to nest with the second cart when the first and second carts are connected to each other such that a footprint of the connected first and second carts covers an area that is less than a sum of areas for the footprints for the bases of the first and second carts,
wherein two rolling members of the first cart overlap with the footprint of the base of the second cart when the first and second carts are connected to each other,
wherein two rolling members of the first cart and a portion of the base of the first cart fit under the base of the second cart when the first and second carts are connected to each other,
wherein the linking structure comprises a first locking mechanism on the first cart having cover plates and catches forming cavities, and a second locking mechanism on the second cart having posts configured to be contained within the cavities.

12. The cart system of claim 11, wherein the two rolling members of the first cart entirely fit within the footprint of the base of the second cart when the first and second carts are connected to each other.

13. The cart system of claim 11, wherein the linking structure further contains an actuator configured to rotate the cover plates so as to expose the cavities to the posts during joining of the first and second carts.

14. The cart system of claim 11, further comprising a third cart;
wherein the third cart includes a housing, at least one compartment located between two side walls of the housing of the third cart, and a base having rolling members to permit movement of the third cart;
wherein another linking structure that permits the first and third carts to be connected together for joint movement is partially disposed on each of the first and third carts; and
wherein the first, second, and third carts have the same height, and the same footprint for their respective bases.

15. A cart system comprising:
a first cart including:
a housing,
at least one compartment located between two side walls of the housing of the first cart, and
a base having rolling members to permit movement of the first cart; and
a second cart including:
a housing,
at least one compartment located between two side walls of the housing of the second cart, and
a base having rolling members to permit movement of the second cart,
wherein a linking structure that permits the first and second carts to be connected together for, joint movement is partially disposed on each of the first and second bases,
wherein the first cart is configured to nest with the second cart when the first and second carts are connected to each other such that the bases of the first and second carts overlap each other in a nested configuration,
wherein the first and second carts have a same footprint for their respective bases, and
wherein two of the rolling members of the first cart fit under the base of the second can when the first and second carts are connected to each other,
wherein the rolling members of the first cart are placed at corners of the base of the first cart which are outside of a footprint of the housing of the first cart, and wherein the rolling members of the second cart are placed at corners of the base of the second cart which are outside of a footprint of the housing of the second cart.

16. The cart system of claim 15, wherein the two rolling members of the first cart are disposed between two rolling members of the second cart when the first and second carts are connected to each other.

17. The cart system of claim 15, wherein the linking structure comprises a first locking mechanism on the base of the first cart having cover plates and catches forming cavities, and a second locking mechanism on the base of the second cart having posts configured to be contained within the cavities.

18. The cart system of claim 17, wherein the linking structure further contains an actuator configured to rotate the cover plates so as to expose the cavities to the posts during joining of the first and second carts.

19. A cart system comprising:
a first cart including:
 a housing,
 at least one compartment located between two side walls of the housing of the first cart, and
 a base having rolling members to permit movement of the first cart; and
a second cart including:
 a housing,
 at least one compartment located between two side walls of the housing of the second cart, and
 a base having rolling members to permit movement of the second cart,
wherein a linking structure that permits the first and second carts to be connected together for joint movement is partially disposed on each of the first and second carts,
wherein the first cart is configured to nest with the second cart when the first and second carts are connected to each other such that the housing of the first cart runs alongside and parallel to the housing of the second cart,
wherein the linking structure comprises a first locking mechanism on the first cart having cover plates and catches forming cavities, and a second locking mechanism on the second cart having posts configured to be contained within the cavities,
wherein the linking structure further contains an actuator configured to rotate the cover plates so as to expose the cavities to the posts during joining of the first and second carts,
wherein the actuator comprises a foot pedal and a pivot rod,
wherein the first locking mechanism comprises beams connected to the pivot rod and cover plates, and
wherein, when the foot pedal is depressed, the pivot rod is configured to rotate such that the beams are pulled toward a center of the base of the first cart, which causes the cover plates to rotate toward the center of the base of the first cart, thus exposing the cavities in the catches.

20. The cart system of claim 19, wherein, when the foot pedal is released, the pivot rod is configured to rotate back to a resting position, thereby pushing the beams away from the center of the base of the first cart, which rotates the cover plates to enclose the cavities.

* * * * *